United States Patent
Gustafson et al.

(10) Patent No.: US 11,030,067 B2
(45) Date of Patent: Jun. 8, 2021

(54) COMPUTER SYSTEM AND METHOD FOR PRESENTING ASSET INSIGHTS AT A GRAPHICAL USER INTERFACE

(71) Applicant: Uptake Technologies, Inc., Chicago, IL (US)

(72) Inventors: Kirk Gustafson, Downers Grove, IL (US); Mitch Laski, Chicago, IL (US); Michael Kerstein, Glenview, IL (US); Rohitha Ken Perera, Chicago, IL (US); Matthew Reilly, Chicago, IL (US); Stephanie Shapiro, Chicago, IL (US); Chris Paskvan, Wheaton, IL (US); Amanda Caffery, Chicago, IL (US); Nikhil Gahlawat, Chicago, IL (US)

(73) Assignee: Uptake Technologies, Inc., Chicago, IL (US)

( * ) Notice: Subject to any disclaimer, the term of this patent is extended or adjusted under 35 U.S.C. 154(b) by 161 days.

(21) Appl. No.: 16/260,883

(22) Filed: Jan. 29, 2019

(65) Prior Publication Data
US 2020/0241990 A1 Jul. 30, 2020

(51) Int. Cl.
*G06F 11/00* (2006.01)
*G06F 11/30* (2006.01)
(Continued)

(52) U.S. Cl.
CPC ........ *G06F 11/3082* (2013.01); *G06F 11/079* (2013.01); *G06F 11/0766* (2013.01); *G06F 11/0781* (2013.01); *G06F 11/327* (2013.01)

(58) Field of Classification Search
CPC ............ G06F 11/0766; G06F 11/0781; G06F 11/0784; G06F 11/079; G06F 11/324; G06F 11/3476
See application file for complete search history.

(56) References Cited

U.S. PATENT DOCUMENTS

| 5,566,092 A | 10/1996 | Wang et al. |
| 5,633,800 A | 5/1997 | Bankert et al. |

(Continued)

FOREIGN PATENT DOCUMENTS

| JP | 2006277185 A | 10/2006 |
| WO | 2011117570 | 9/2011 |

(Continued)

OTHER PUBLICATIONS

International Searching Authority International Search Report and Written Opinion for PCT/US2020/015482, dated May 22, 2020, 12 pages.

(Continued)

*Primary Examiner* — Charles Ehne
(74) *Attorney, Agent, or Firm* — Lee Sullivan Shea & Smith LLP

(57) ABSTRACT

A computing system is configured to derive insights related to asset operation and present these insights via a GUI. To these ends, the computing system (a) receives data related to the operation of assets, (b) based on this data, derives a plurality of insights related to the operation of at least a subset of the assets, (c) from the insights, defines a given subset of insights to be presented to a user, (d) defines at least one aggregated insight representative of one or more individual insights in the given subset of insights that are related to a common underlying problem, and (e) causes the user's client station to display a visualization of the given subset of insights including (i) an insights pane that provides a high-level overview of the subset of insights and (ii) a details pane that provides additional details regarding a selected one of the subset of insights.

20 Claims, 14 Drawing Sheets

(51) Int. Cl.
  *G06F 11/32* (2006.01)
  *G06F 11/07* (2006.01)

(56) References Cited

U.S. PATENT DOCUMENTS

| | | |
|---|---|---|
| 6,256,594 B1 | 7/2001 | Yamamoto et al. |
| 6,336,065 B1 | 1/2002 | Gibson et al. |
| 6,442,542 B1 | 8/2002 | Ramani et al. |
| 6,473,659 B1 | 10/2002 | Shah et al. |
| 6,622,264 B1 | 9/2003 | Bliley et al. |
| 6,634,000 B1 | 10/2003 | Jammu et al. |
| 6,643,600 B2 | 11/2003 | Yanosik et al. |
| 6,650,949 B1 | 11/2003 | Fera et al. |
| 6,725,398 B1 | 4/2004 | Varma et al. |
| 6,760,631 B1 | 7/2004 | Berkowitz et al. |
| 6,775,641 B2 | 8/2004 | Wegerich et al. |
| 6,799,154 B1 | 9/2004 | Aragones et al. |
| 6,823,253 B2 | 11/2004 | Brunell |
| 6,859,739 B2 | 2/2005 | Wegerich et al. |
| 6,892,163 B1 | 5/2005 | Herzog et al. |
| 6,947,797 B2 | 9/2005 | Dean et al. |
| 6,952,662 B2 | 10/2005 | Wegerich et al. |
| 6,957,172 B2 | 10/2005 | Wegerich |
| 6,975,962 B2 | 12/2005 | Wegerich et al. |
| 7,020,595 B1 | 3/2006 | Adibhatla et al. |
| 7,082,379 B1 | 7/2006 | Bickford et al. |
| 7,100,084 B2 | 8/2006 | Unkle et al. |
| 7,107,491 B2 | 9/2006 | Graichen et al. |
| 7,127,371 B2 | 10/2006 | Duckert et al. |
| 7,233,886 B2 | 6/2007 | Wegerich et al. |
| 7,280,941 B2 | 10/2007 | Bonanni et al. |
| 7,308,385 B2 | 12/2007 | Wegerich et al. |
| 7,373,283 B2 | 5/2008 | Herzog et al. |
| 7,403,869 B2 | 7/2008 | Wegerich et al. |
| 7,409,320 B2 | 8/2008 | Wegerich |
| 7,415,382 B1 | 8/2008 | Bickford et al. |
| 7,428,478 B2 | 9/2008 | Aragones |
| 7,447,666 B2 | 11/2008 | Wang |
| 7,457,693 B2 | 11/2008 | Olsen et al. |
| 7,457,732 B2 | 11/2008 | Aragones et al. |
| 7,509,235 B2 | 3/2009 | Bonissone et al. |
| 7,536,364 B2 | 5/2009 | Subbu et al. |
| 7,539,597 B2 | 5/2009 | Wegerich et al. |
| 7,548,830 B2 | 6/2009 | Goebel et al. |
| 7,634,384 B2 | 12/2009 | Eryurek et al. |
| 7,640,145 B2 | 12/2009 | Wegerich et al. |
| 7,660,705 B1 | 2/2010 | Meek et al. |
| 7,725,293 B2 | 5/2010 | Bonissone et al. |
| 7,739,096 B2 | 6/2010 | Wegerich et al. |
| 7,756,678 B2 | 7/2010 | Bonissone et al. |
| 7,822,578 B2 | 10/2010 | Kasztenny et al. |
| 7,869,908 B2 | 1/2011 | Walker |
| 7,919,940 B2 | 4/2011 | Miller et al. |
| 7,941,701 B2 | 5/2011 | Wegerich et al. |
| 7,962,240 B2 | 6/2011 | Morrison et al. |
| 8,024,069 B2 | 9/2011 | Miller et al. |
| 8,050,800 B2 | 11/2011 | Miller et al. |
| 8,145,578 B2 | 3/2012 | Pershing et al. |
| 8,229,769 B1 | 7/2012 | Hopkins |
| 8,234,420 B2 | 7/2012 | Lueckenbach et al. |
| 8,239,170 B2 | 8/2012 | Wegerich |
| 8,275,577 B2 | 9/2012 | Herzog |
| 8,285,402 B2 | 10/2012 | Lueckenbach et al. |
| 8,311,774 B2 | 11/2012 | Hines |
| 8,352,216 B2 | 1/2013 | Subbu et al. |
| 8,532,795 B2 | 9/2013 | Adavi et al. |
| 8,533,018 B2 | 9/2013 | Miwa et al. |
| 8,560,494 B1 | 10/2013 | Downing et al. |
| 8,620,618 B2 | 12/2013 | Eryurek et al. |
| 8,620,853 B2 | 12/2013 | Herzog |
| 8,626,385 B2 | 1/2014 | Humphrey |
| 8,645,276 B2 | 2/2014 | Wong et al. |
| 8,660,980 B2 | 2/2014 | Herzog |
| 8,689,108 B1 | 4/2014 | Duffield et al. |
| 8,713,467 B1 | 4/2014 | Goldenberg et al. |
| 8,786,605 B1 | 7/2014 | Curtis et al. |
| 8,799,799 B1 | 8/2014 | Cervelli et al. |
| 8,812,960 B1 | 8/2014 | Sun et al. |
| 8,832,594 B1 | 9/2014 | Thompson et al. |
| 8,850,000 B2 | 9/2014 | Collins et al. |
| 8,862,938 B2 | 10/2014 | Souvannarath |
| 8,868,537 B1 | 10/2014 | Colgrove et al. |
| 8,886,601 B1 | 11/2014 | Landau et al. |
| 8,909,656 B2 | 12/2014 | Kumar et al. |
| 8,917,274 B2 | 12/2014 | Ma et al. |
| 8,918,246 B2 | 12/2014 | Friend |
| 8,924,429 B1 | 12/2014 | Fisher et al. |
| 8,935,201 B1 | 1/2015 | Fisher et al. |
| 8,937,619 B2 | 1/2015 | Sharma et al. |
| 8,938,686 B1 | 1/2015 | Erenrich et al. |
| 9,842,034 B2 * | 12/2017 | Heliker ............... G06F 11/0751 |
| 2002/0091972 A1 | 7/2002 | Harris et al. |
| 2002/0152056 A1 | 10/2002 | Herzog et al. |
| 2003/0055666 A1 | 3/2003 | Roddy et al. |
| 2003/0126258 A1 | 7/2003 | Conkright et al. |
| 2004/0181712 A1 | 9/2004 | Taniguchi et al. |
| 2004/0243636 A1 | 12/2004 | Hasiewicz et al. |
| 2005/0119905 A1 | 6/2005 | Wong et al. |
| 2005/0222747 A1 | 10/2005 | Vhora et al. |
| 2007/0067678 A1 | 3/2007 | Hosek et al. |
| 2007/0263628 A1 | 11/2007 | Axelsson et al. |
| 2008/0059080 A1 | 3/2008 | Greiner et al. |
| 2008/0059120 A1 | 3/2008 | Xiao et al. |
| 2012/0271612 A1 | 10/2012 | Barsoum et al. |
| 2012/0310597 A1 | 12/2012 | Uchiyama et al. |
| 2013/0010610 A1 | 1/2013 | Karthikeyan et al. |
| 2013/0024416 A1 | 1/2013 | Herzog |
| 2013/0283773 A1 | 10/2013 | Hague |
| 2013/0325502 A1 | 12/2013 | Robicsek et al. |
| 2014/0012886 A1 | 1/2014 | Downing et al. |
| 2014/0032132 A1 | 1/2014 | Stratton et al. |
| 2014/0060030 A1 | 3/2014 | Ma et al. |
| 2014/0089035 A1 | 3/2014 | Jericho et al. |
| 2014/0105481 A1 | 4/2014 | Hasselbusch et al. |
| 2014/0121868 A1 | 5/2014 | Zhang et al. |
| 2014/0169398 A1 | 6/2014 | Arndt et al. |
| 2014/0170617 A1 | 6/2014 | Johnson et al. |
| 2014/0184643 A1 | 7/2014 | Friend |
| 2014/0222355 A1 | 8/2014 | Cheim et al. |
| 2014/0330600 A1 | 11/2014 | Candas et al. |
| 2014/0330749 A1 | 11/2014 | Candas et al. |
| 2014/0351642 A1 | 11/2014 | Bates et al. |
| 2014/0357295 A1 | 12/2014 | Skomra et al. |
| 2014/0358601 A1 | 12/2014 | Smiley et al. |
| 2015/0046870 A1 | 2/2015 | Goldenberg et al. |
| 2015/0235141 A1 | 8/2015 | Rensing et al. |
| 2015/0262060 A1 | 9/2015 | Husain et al. |
| 2017/0344926 A1 * | 11/2017 | Chakra ............... G06F 16/2465 |
| 2018/0052726 A1 | 2/2018 | Yoshida et al. |
| 2018/0107528 A1 * | 4/2018 | Vizer ................... G06F 16/287 |

FOREIGN PATENT DOCUMENTS

| | | |
|---|---|---|
| WO | 2013034420 | 3/2013 |
| WO | 2014145977 | 9/2014 |
| WO | 2014205497 | 12/2014 |

OTHER PUBLICATIONS

Biswas, Trisha. Redundancy-based Approaches in Wireless Multihop Network Design. PhD Dissertation Submitted to Graduate Faculty of North Carolina State University, Raleigh, North Carolina, Mar. 25, 2014, pp. 1-141 [online], [retrieved on May 26, 2015]. Retrieved from the Internet <URL:https://repository.lib.ncsu.edu/bitstream/handle/1840.16/9313/etd.pdf?sequence=2&isAllowed=y>.

Isermann, Rolf. Model-based Fault Detection and Diagnosis—Status and Applications. Institute of Automatic Control, Darmstadt University of Technology, Darmstadt, Germany, Jun. 2004, pp. 1-12. [online], [retrieved on Oct. 8, 2015]. Retrieved from the Internet <URL: http://citeseerx.ist.psu.edu/viewdoc/download?doi=10.1.1.113.9295&rep=rep1&type=pdf>.

(56) References Cited

OTHER PUBLICATIONS

Narasimhan et al. Combining Model-Based and Feature-Driven Diagnosis Approaches—A Case Study on Electromechanical Actuators. 21st International Workshop on Principles of Diagnosis 2010, pp. 1-8. [online], [retrieved on Oct. 8, 2015] Retrieved from the Internet <URL:https://ti.arc.nasa.gov/publications/2266/download/>.

Prentzas et al. Categorizing Approaches Combining Rule-Based and Case-Based Reasoning. Expert Systems 24, Apr. 17, 2007, pp. 1-34 [online], [retrieved on Oct. 8, 2015]. Retrieved from the Internet <URL:http://citeseerx.ist.psu.edu/viewdoc/download?doi=10.1.1.143.2780&rep=rep1&type=pdf>.

Infor M3 Enterprise Management System. Datasheet [online]. Infor, 2014 [retrieved May 19, 2015]. Retrieved from the Internet: <URL:www.infor.com.html>.

Infor Equipment. Datasheet [online]. Infor, 2012 [retrieved May 19, 2015]. Retrieved from the Internet: <URL:www.infor.com.html>.

Infor Introduces Next-Generation Solution for Equipment Dealers and Service Providers. Infor, Feb. 2014 pp. 1-5. [online], [retrieved May 19, 2015]. Retrieved from the Internet:<URL:www.infor.com/company/news/pressroom/pressreleases/M3equipment.html>.

Infor Equipment for Rental. Datasheet [online] Infor, 2013 [retrieved May 19, 2015]. Retrieved from the Internet:<URL: www.infor.com.html>.

Waltermire et al. Applying the Continuous Monitoring Technical Reference Model to the Asset, Configuration, and Vulnerability Management Domains (DRAFT). National Institute of Standards and Technology, U.S. Department of Commerce, Jan. 2012, pp. 1-23 [online], [retrieved Oct. 6, 2015]. Retrieved from the Internet: URL<https://csrc.nist.gov/CSRC/media/Publications/nistir/7800/draft/documents/Draft-NISTIR-7800.pdf.

\* cited by examiner 700
710

| 54 Insights | |
|---|---|
| SORT BY Priority | |

⚠ Card 1 Headline
Tractor 2122
(122)                    730a

⚠ Card 2 Headline
Tractor 2122
(678)                    730b

⚠ Card 3 Headline
Tractor 2100
(35)                     730c

⚠ Card 4 Headline
Tractor 2022
(1)                      730d

⊘ Card 5 Headline
Tractor 1998
(25)                     730e

⊙ Card 6 Headline
Tractor 0222
(550)                    730f

⊙ Card 7 Headline
Tractor 1998
                         730g

⚠ Card 8 Headline

INSIGHT LABEL

⚠ Card 2 Headline                 740

Insight Description

678 Occurrences:                  720
9/4/2018 3:45 PM - 3:59 PM

Data Timeline                     750

Asset Status                      760

XXX
XXX
XXX

Recent Events                     770

| XXX ▽ | XXX | XXX | XXXX | XXXXXX |
| XXX | XXX | XXX | XXXX | XXXXXX |
| XXX | XXX | XXX | XXXX | XXXXXX |

FIG. 7A

Recent Faults — 771

| Code ▽ | Fault Name | Occurrences | First Occurrence | Last Occurrence |
|---|---|---|---|---|
| 3216 | Lorem ipsum dolor... | 24 | 7-03-18 17:25 | 7-03-18 17:13 |
| 520603 | Dolor sit amet... | 3 | 6-28-18 16:22 | 6-28-18 16:56 |
| 3216 | Lorem ipsum dolor... | 1 | 6-27-18 23:28 | 6-27-18 23:28 |
| 520603 | Dolor sit amet... | 2 | 6-27-18 22:42 | 6-27-18 22:58 |
| 3216 | Lorem ipsum dolor... | 2 | 6-27-18 21:05 | 6-27-18 21:42 |

FIG. 7F

COMPUTER SYSTEM AND METHOD FOR PRESENTING ASSET INSIGHTS AT A GRAPHICAL USER INTERFACE

BACKGROUND

Today, machines (also referred to herein as "assets") are ubiquitous in many industries. From locomotives that transfer cargo across countries to farming equipment that harvest crops, assets play an important role in everyday life. Depending on the role that an asset serves, its complexity, and cost, may vary.

Because of the increasing role that assets play, it is also becoming increasingly desirable to monitor and analyze the operation of assets in a given operating environment. To facilitate this, assets may be equipped with components that are configured to monitor various operating parameters of the asset and then send data indicative of these operating parameters to a data analytics platform that is configured to analyze the data, in order to learn more about the operation of the assets.

OVERVIEW

In general, a data analytics platform may be configured to perform various computing tasks related to monitoring, analyzing, and/or making predictions about the operation of assets in a real-world operating environment, such as a rail network, a construction or mining site, etc. For instance, an organization that is interested in monitoring and evaluating asset operation may leverage a data analytics platform that is configured to receive data related to asset operation, derive insights related to asset operation (e.g., detections of forthcoming failures, anomalies, or other noteworthy abnormalities at an asset) based on that data, and then present those insights to users that are responsible for overseeing or otherwise managing the assets that are under evaluation.

However, in practice, a data analytics platform may be configured to analyze a large volume of data related to the operation of a large number of different assets. As a result, the number of insights derived by the platform may likewise be voluminous, particularly in scenarios where the platform is configured to derive multiple, different categories of insights related to the operation of a large number of assets. In such a scenario, existing data analytics platforms fail to present their derived insights to a user responsible for overseeing assets in an effective manner.

For instance, one existing approach for presenting insights to a user responsible for overseeing assets involves presenting the user with a notification (or the like) for every derived insight, which may ultimately result in the user being overwhelmed with notifications to the point that the user is desensitized to the notifications and/or the notifications are no longer usable by the individual. Moreover, existing approaches for presenting a user with notifications (or the like) for derived insights may require the user to navigate through various different applications, graphical user interface (GUI) screens, or the like to access relevant information and/or functions of interest related to the derived insights. Accordingly, there remains a need for technology that can be used by a data analytics platform to present derived insights to users responsible for overseeing assets in an effective manner.

To address these and other problems with existing data analytics platforms, disclosed herein is an innovative approach for deriving insights related to asset operation (i.e., "asset insights") and presenting these insights to a user via a GUI. Advantageously, the disclosed technology may facilitate providing efficient access to the most relevant information and/or functions of interest related to derived insights, which may improve user experience and perhaps also help to reduce the computing resources that may otherwise be used as users navigate through various different applications, GUI views, or the like to access information and/or functions of interest. In this way, the disclosed technology provides specific improvements over existing technology employed by data analytics platforms for deriving and presenting asset insights.

In operation, as noted above, a data analytics platform may be commissioned to monitor the operation of one or more sets of assets (e.g., a fleet of mining equipment, construction equipment, and/or locomotives, a group of wind turbines at a wind site, etc.), and may perform a variety of tasks based on that monitoring. As an example of such a task, the platform may be configured to derive insights based on data related to the operation of the assets, such as operating data that is indicative of the operation of the assets (e.g., measurement data from sensors arranged on the assets, abnormal-conditions data indicating occurrences of faults and/or other kinds of abnormal conditions at the assets, etc.), maintenance data that is related to the maintenance of a plurality of assets, and/or environmental data that is related to an environment in which assets operate, among various other types of asset-related data.

In general, a derived insight may comprise a detection by the data analytics platform of a potential problem at an asset that might be of interest to (i.e., may require action by) a user that oversees or otherwise manages the asset. For instance, a given insight may comprise a detection by the platform of some kind of abnormality related to an asset's operation that is indicative of a potential problem at the asset. In this respect, various categories of insights are possible.

One possible category is an outlier insight, which may comprise a determination by the data analytics platform that measurement values output by one or more sensors of a given asset are abnormal or otherwise unexpected. For example, the platform may determine that a measurement value output by a particular sensor of a given asset is outside of a normal range for the particular sensor, where the normal range may be defined based on historical data for the particular sensor of the given asset and/or similar sensors of one or more other assets that reflect the values of the particular sensor during normal asset operation.

Another possible category is a critical-fault insight, which may comprise a determination by the data analytics platform that a given type of fault deemed to be "critical" has occurred at a given asset (e.g., a type of fault that may result in inoperability of the given asset). For instance, the platform may determine, based on operating data for a given asset, that a particular fault code was triggered at the given asset that is representative of a given type of fault considered to be "critical," such as an engine failure.

Yet another possible category is a failure-prediction insight, which may comprise a prediction by the data analytics platform that a given type of failure is likely to occur at a given asset in the foreseeable future. In this respect, the platform may render such a prediction using a failure prediction model that is configured to receive data related to the operation of the given asset as the model's inputs and then output an indication of whether a failure of the given type is predicted to occur at the given asset within some period of time in the future (e.g., within the next two weeks).

Still another possible category is an anomaly insight, which may comprise a prediction by the data analytics platform that multivariate sensor data being output by a given asset (e.g., measurement values output by a particular set of sensors at the given asset) is indicative of a potential problem at the given asset. In this respect, the platform may render such a prediction using an anomaly detection model that is configured to receive an asset's multivariate sensor data and output an indication of whether an anomaly has been detected at the given asset.

Other possible categories of derived insights are also possible, including but not limited to predictions of other types of event occurrences at an asset.

In any case, the data analytics platform may store data defining the derived insights, which it may subsequently access to facilitate presenting insight visualizations to users via a GUI. In this regard, the platform may be configured to provide users with a new GUI view for visualizing and interacting with insights of interest, which is intended to help a user to quickly understand the nature of derived insights and to efficiently access relevant information and functions of interest related to the insights. To these ends, the new GUI view (i.e., "insights view") may take various forms.

In one example embodiment, an insights view may include multiple panes, each providing a different level of detail regarding derived insights. In one particular implementation, the insights view includes at least a first pane referred to herein as the "insights pane" and a second pane referred to herein as the "details pane." However, an insights view may include additional panes as well, some of which are discussed below.

As discussed further below, the insights pane of the example insights view may comprise an arrangement (e.g., a list or the like) of GUI elements corresponding to a particular subset of derived insights to be presented to a user, where each individual insight GUI element (i.e., "insight entry") within the insights pane may provide a high-level overview of a respective derived insight. In practice, the data analytics platform may utilize logic to generate a data object that defines the visual appearance of the insights pane (and the individual entries thereof) and is renderable by a user's client station (or the like) to display the insights pane to the user.

In turn, the details pane of the example insights view may provide certain additional details regarding one particular insight included in the insights pane (e.g., a particular insight that has been selected by the user via the insights pane) via one or more GUI panels, where the additional details and the GUI panel(s) included in the details pane may vary depending on the nature of the one particular insight (e.g., the category of the particular insight). In practice, the data analytics platform may utilize logic to generate a data object that defines the visual appearance of the details pane (including which additional details and GUI panel(s)) are to be presented via the details pane and is renderable by a user's client station (or the like) to display the details pane to the user.

In accordance with the present disclosure, the data analytics platform may present an insights GUI view to a user responsible for overseeing or otherwise managing particular assets in various manners. In one example implementation, this process may begin with the platform receiving from a client station of a given user (e.g., a mobile phone, tablet, laptop, etc.) a request for access to asset insights that have been derived by the platform. This request may include access credentials (e.g., a username and password) or the like that are used to verify the identity of the given user, who may have previously registered with the platform through an onboarding process (or the like).

Based on the identity of the given user, the data analytics platform may access user preferences information associated with the given user, which may then be used by the platform to define the particular subset of asset insights that are to be presented to the given user via an insights GUI view. In practice, the platform may have previously received this user preferences information associated with the given user in various manners, such as during the onboarding process (or the like).

The user preferences information that is accessed and used by the data analytics platform to define the particular subset of insights to be presented to the given user may take various forms, examples of which may include an indication of which assets are most important to the given user (i.e., "high-priority" assets), an indication of which categories of insights are most important to the given user (e.g., outlier insights), an indication of which insight severity levels are most important to the given user (e.g., "Critical" insights), an indication of insight states that are most important to the given user (e.g., "new," "open," "in progress," "closed," etc. insights), an indication of an insight occurrence state that is most important to the given user (e.g., insights corresponding to events that have already occurred or to predictions of events that will occur in the future), and/or an indication of an insight confidence level corresponding to the platform's confidence in deriving a given insight, among other possibilities. Further, in practice, the user preferences information could be user preferences information specific to one particular platform user or could be user preferences information for a particular company, organization, or the like (in which case such user preferences information may be used for multiple platform users).

Based on the accessed user preferences information and the universe of available insights that the data analytics platform derived, the platform may define the particular subset of insights for presentation to the given user (i.e., a "curated set of insights"). In this regard, while there may be a larger set of available insights that could potentially be of some interest to the given user (e.g., insights related to all assets for which the given user has responsibility, regardless of the category or status of the insights), the platform may use the user preferences information to filter this larger set of insights down to a smaller subset of insights that are of most interest to the given user (e.g., a subset that includes insights for particular assets only, particular categories of insights only, insights having a particular status, etc.). Further, the platform may also use the user preferences information to determine a priority of the particular subset of insights that is defined for the given user, and this priority may then be used as a basis for determining how the corresponding insight entries are organized when presented to the given user (e.g., such as by placing higher priority insights at the top of a list). However, the insights view that is ultimately presented to the given user may allow the user to organize the presented insight entries in other manners as well (e.g., by sorting by date).

In some embodiments, in addition to or instead of user preferences information, the data analytics platform may be configured to use other types of information to define the particular subset of insights to be presented to the given user. As one possibility, the platform may use asset environmental data (e.g., geospatial, seasonality, and/or weather data) as a basis to define the particular subset of insights to be presented to the given user, among other data. For instance, when defining the particular subset of insights to be presented to the given user, the platform may access environmental data for the location(s) of the assets associated with the given user and may then use this environmental data as an additional basis for filtering and/or otherwise selecting the particular insights that are included in the subset.

For example, the data analytics platform may not include in the subset (or de-prioritize) insights that are based on high temperature readings at an asset if the ambient temperature at the asset's location is high, whereas the platform may include in the subset (and perhaps prioritize) insights that are based on high temperature readings at an asset if the temperature at the asset's location is low. As another example, the platform may not include in the subset (or de-prioritize) insights that are based on high RPM readings at an asset if the terrain at the asset's location includes steep inclines, whereas the platform may include in the subset (and perhaps prioritize) insights that are based on high RPM readings at an asset if the terrain at the asset's location is relatively flat. As yet another example, the platform may not include in the subset (or de-prioritize) insights that are derived based on data corresponding to instances in time when an asset is located at a particular location of interest (e.g., an organization's maintenance facility). Other examples are also possible.

According to another aspect of example embodiments, after the data analytics platform has defined the particular subset of insights to be presented to the given user, the platform may employ logic to determine whether any of the individual insights in the subset share a relationship, such that they should be grouped into an "aggregated insight." The platform may be configured to generate aggregated insights based on a variety of criteria.

As one possibility, the data analytics platform may be configured with logic that enables the platform to determine (i) whether insights appear to be related to a common underlying problem at a given asset and (ii) whether aggregation should apply. In practice, the logic may include a variety of aggregation rules, such as one or more rules dictating that insights that correspond to a common underlying problem at a given asset and that have an associated time that falls within a threshold window of time of one another are grouped together.

As one example to illustrate, the data analytics platform may be configured with logic dictating that if an engine failure has been predicted for a given asset, then other insights (i) that are related to the given asset's engine (e.g., outlier and/or anomaly insights derived based on sensor data associated with the given asset's engine, critical faults related to the given asset's engine, etc.) and (ii) that have an associated time (e.g., a time when a critical fault or outlier occurred or a time in the future when a failure is predicted to occur) that falls within a certain amount of time of one another should be grouped together with the engine failure prediction into a single aggregated insight. Additional engine-failure related insights may continue to be grouped into this aggregated insight if such insights have a time that falls within a given window of time after the most-recently derived insight in the group. On the other hand, if the given window of time after the most-recently derived insight in the group elapses without any new, related insights being derived having a time within the given window of time, then additional engine-failure related insights for the given asset may thereafter be grouped into a new, separate aggregated insight. Many other examples are possible as well.

In any case, after the data analytics platform has defined the particular subset of insights to be presented to the given user and potentially identified one or more aggregated insights, the platform may then generate, based on (i) data defining the insights included in the particular subset of insights to be presented to the given user (i.e., "insights data") and (ii) logic for the insights pane, a data object that defines the visual appearance of a particular insights pane and enables the given user's client station to render the particular insights pane. In example embodiments, the logic for the insights pane may cause the platform to access one or more predefined presentation templates and populate fields thereof based on at least parts of the data defining the insights included in the subset. The platform may generate the insights-pane data object in other manners as well.

Additionally, the data analytics platform may generate a data object that defines the visual appearance of a particular details pane and enables the given user's client station to render the particular details pane. In practice, the platform may generate the details-pane data object in a variety of manners. As one possibility, the platform may first select, from the particular subset of insights to be presented to the given user, a first insight for which the details pane will provide additional information. The platform may select this first insight in a variety of manners. In some cases, this insight may be selected based on how the subset of insights is organized. For example, if the particular subset of insights to be presented to the given user is arranged as a list, the selected insight may be the first insight in the list. Notably, in some implementations, a first instance of the insights GUI view that the platform presents to the user's client station may include a "blank" details pane, in which case the details-pane data object may be empty or otherwise indicate that no insight details are to be displayed.

In any event, based on (i) data defining the first selected insight, (ii) logic for the details pane, and (iii) perhaps other data associated with the first selected insight, the data analytics platform may generate a data object that defines the visual appearance of a particular details pane that provides additional details regarding the first insight and enables the given user's client station to render the particular details pane. In particular, in example implementations, the logic for the details pane may cause the platform to dynamically assemble a presentation template for the particular details pane by (i) identifying the category of the first selected insight and (ii) based on the identified category, accessing one or more panel templates. In this respect, the panels that are included in a presentation template may differ depending on the nature of the first selected insight (e.g., the category of the first selected insight).

In example embodiments, regardless of the nature of the first selected insight, a details-pane presentation template may include at least (i) a summary panel that provides high-level details for the selected insight, (ii) an asset-status panel that provides additional details regarding the status of the asset that is the subject of the insight (e.g., details regarding the asset's most recent status), and (iii) a recent-events panel that provides details regarding recent events that occurred at the asset. The remaining panels of the presentation template (if any) may then vary depending on the category of the selected insight. For example, if the selected insight is an outlier insight, a channel-plot panel may be included that comprises a time-series graph of the recent values of the sensor that is the subject of the outlier-type insight, perhaps along with an indication of the normal range of values for the sensor. As another example, if the selected insight is a critical-fault insight, a fault-occurrence timeline panel may be included that comprises a timeline of occurrences of the fault type that is the subject of the critical fault-type insight. As yet another example, if the selected insight is a failure-prediction or anomaly insight, one or more panels may be included for presenting contextual information that is specifically relevant to the particular type of failure or anomaly that has been predicted by the data analytics platform (in which case the presentation templates may vary at both an insight-category-level and also at a more granular level). A presentation template for a particular details pane may include other types of panels as well.

In any case, after the data analytics platform has added the applicable panel templates to the details-pane presentation template, the platform may populate respective fields of the panel templates using data defining the first selected insight as well as other data related to the insights, such as operating data (e.g., sensor data and/or abnormal-conditions data related to the insight), maintenance data, and/or environmental data (e.g., last known geospatial data for the asset corresponding to the insight), among other examples.

Furthermore, the logic for the details pane may also determine which particular data variables (e.g., particular data fields, plot channels, etc.) are to be populated into a particular panel template based on data associated with the first selected insight, such as data identifying the particular type of failure or anomaly that is the subject of the selected insight (e.g., an identifier of the particular model that was used to derive the selected insight). For example, if the first selected insight was derived using a particular failure model, the logic may determine that a channel-plot panel of the details pane is to be populated with a particular window of time-series data for each data variable that serves as an input to that failure model (or at least a given subset of the failure model's input variables). Other examples are also possible.

Notably, in some cases, the data analytics platform may utilize data associated with the first selected insight, such as data identifying the particular type of failure or anomaly that is the subject of the selected insight (e.g., an identifier of the particular model that was used to derive the selected insight), to identify one or more panel templates to include in the details-pane presentation template in the first instance. For example, if the first selected insight was derived using a particular anomaly model, the logic for the details pane may determine that a given type of panel is applicable to that particular anomaly model, which may cause the platform to add a panel template corresponding to that given type of panel to the details-pane presentation template. Other examples are also possible.

In a scenario where the first selected insight is representative of a group of insights (i.e., is an aggregated insight) rather than an individual insight, the data analytics platform's logic may be configured to elect one of the constituent insights (e.g., the highest priority insight within the group), and the details-pane presentation template for the first selected insight aggregated insight may then be based on that constituent insight.

After defining the data objects for the particular insights and details panes, the data analytics platform may then transmit the data objects to the given user's client station, which in turn renders the insights GUI view comprising the particular insights and details panes using the data objects. As suggested before, the particular subset of insights may be presented to the given user within the insights pane in a variety of arrangements, such as a list, chart, diagram, or some other visual arrangement. Likewise, each individual insight entry within the particular arrangement may take a variety of forms, such as a rectangular or other shaped "tile" (or "card").

In turn, each insight entry may include a variety of GUI elements. For example, each insight entry may include an asset indicator that identifies the particular asset corresponding to the derived insight. An asset indicator may take a variety of forms, such as a textual identifier, a unique icon, etc. As another example, each insight entry may include a GUI element indicative of a severity level that has been assigned to the given insight, which may take a variety of forms (e.g., an icon or the like) and may help a user to easily identify insights that are of greater import than others. As yet another example, each insight entry may include one or more selectable GUI elements, each of which may take a variety of forms and may correspond to a variety of functions of interest. For instance, one such GUI element may be an insight-action element that allows the given user to access action options that, when selected, request that a particular action be taken with respect to the insight, such as to create an asset work order (or other task) or to disregard or otherwise resolve the insight.

An insight entry may include other aspects as well. For instance, as suggested before, certain insights that are presented in the insights pane as a single entry (e.g., a single card) may be representative of multiple, individual derived insights that have been grouped together as an aggregated insight. In example embodiments, an aggregated-insight entry may include a GUI element indicating that the entry represents a group of insights and/or providing a count of the insights that are represented by the group. One of ordinary skill in the art will appreciate that presenting a single entry representing an aggregated insight, as opposed to presenting multiple entries for the group's constituent insights, provides a more manageable but still informative GUI.

As discussed before, a particular details pane may include a variety of different GUI panels, which may depend on the nature of the first selected insight. Each different panel can be presented to the given user in a variety of manners and may include a variety of different GUI elements. In general, each panel includes relevant details for the first selected insight along with other contextual information and/or functions of interest related to the selected insight that the user may find valuable when deciding whether or not to take action on the insight.

After the data analytics platform presents a first instance of the insights view to the given user via the given user's client station, the given user may select a particular insight entry from the insights pane that differs from the entry for the first selected insight, which may trigger the given user's client station to transmit an indication of the given user's selection of the new insight. In turn, the platform may receive the indication of the given user's selection of the new insight entry and identify the applicable underlying insight. Based on (i) data defining this newly-selected insight, (ii) logic for the details pane, and (iii) perhaps other data associated with this newly-selected insight, the platform may generate a new data object that defines the visual appearance of an updated details pane that provides additional details regarding the newly-selected insight and enables the given user's client station to render the updated details pane. The platform may then transmit at least this new data object to the given user's client station, which in turn renders the updated insight view comprising the updated details pane using the new data object. This general process repeats each time the given user selects a new insight entry from the insights pane.

In practice, the given user can interact with the insights GUI view via the given user's client station in a variety of additional manners, which may cause the data analytics platform to receive data indicative of such interactions from the given user's client station. These interactions may take various forms.

As one possibility, the insights view may provide the given user with the option to apply one or more filters to the insight entries that are presented via the insights pane. For instance, as one possible implementation, the insights pane may include GUI elements that allow the given user to select between different filter options for the particular subset of insights that are presented to the given user via the insights pane. Some possible examples of filter criteria that can be applied include status-based filters (e.g., filtering out insights that have been marked as dismissed and/or closed), priority-based filters (e.g., filtering down to only the highest priority insights), and/or time-based filters, among other possibilities. A person of ordinary skill in the art will appreciate that one or more of these applied filter criteria could subsequently be disabled or otherwise removed (e.g., via subsequent selections by the user).

As another possibility, the given user may interact with the insights view in a manner that warrants an update to the insights pane, such as by inputting a request to take a particular action on (e.g., close, dismiss, etc.) a given insight or a request to refresh the displayed insights, among other possibilities. In response to receiving data indicative of such an interaction, the data analytics platform may decide to update the particular subset of insights to be presented to the given user based on the nature of the given user's interaction (e.g., by removing a given insight from the subset that was marked as "closed") and perhaps also based on either or both of (i) the user preferences information associated with the given user or (ii) data defining the most up-to-date universe of available insights that have been derived by the platform.

In some cases, while updating the particular subset of insights to be presented to the given user, the data analytics platform may also re-evaluate whether any insights in the subset are related to the same underlying problem, such that these insights should be grouped together. In this respect, an insight that is newly grouped into an aggregated insight will no longer be presented as an individual insight entry in the insights pane, to the extent that it previously was so presented to the given user.

As yet another possibility, the given user may interact with an insight entry representing an aggregated insight, which may provide certain advanced user functionality. For example, if the given user inputs a request for a certain action to be taken with respect to a given aggregated-insight entry, the data analytics platform may carry out that action with respect to the aggregated insight and the individual insights that define the group, such as by removing the insights from the subset based on a user input marking the aggregated insight as "dismissed."

In a related aspect, the logic for aggregating related insights into a group may also consider user-requested actions for insights in the group when determining whether to aggregate insights. For example, the logic may dictate that insights related to a common underlying problem should continue to be aggregated together into a group until a user requests that a work order (or the like) be created for (or some other action be taken on) one of the insights in the group, after which time any new insights related to that same problem may be grouped into a separate aggregated insight.

In any case, some point after presenting the first instance of the insights view to the given user via the given user's client station, the data analytics platform may define an updated subset of insights to be presented to the given user. In turn, based on (i) the data defining the updated subset of insights and (ii) the logic for the insights pane, the platform may generate an updated data object that enables the given user's client station to render an updated insights pane. The platform may then transmit at least the new data object defining the updated insight pane to the given user's client station, which in turn renders a second instance of the insights view comprising an updated version of insights pane using the new data object.

Various other user interactions with the insights view are also possible, some of which are discussed below.

As mentioned before, an insights GUI view may include other panes in addition to the insights and details panes. For example, the data analytics platform may also present a snapshot pane that can be accessed from various areas of the insights view (e.g., as a popup or slide-out display). In practice, this snapshot pane may include a level of detail regarding a derived insight that is somewhere in between the individual entries included in the insights pane and the details pane.

In some example implementations, all of the various GUI panes that are included in (or otherwise accessible via) an insights GUI view may include one or more interactive elements that, when selected, result in a particular action being taken with respect to a given insight (e.g., the insight may be marked as disregarded or otherwise resolved) or result in a request for certain actions to be taken with respect to the asset corresponding to a given insight (e.g., a request for an asset work order or other task item to be created). In this way, the user can efficiently and readily select an action for a given insight, regardless of the particular pane that the user is currently viewing.

Accordingly, in one aspect, disclosed herein is a computer-implemented method that involves (a) receiving data related to the operation of a plurality of assets, (b) based on the received data, deriving a plurality of insights related to the operation of at least a subset of the plurality of assets, (c) from the plurality of insights, defining a given subset of insights to be presented to a given user, (d) defining at least one aggregated insight, wherein the at least one aggregated insight is representative of one or more individual insights in the given subset of insights that are related to a common underlying problem, and wherein the at least one aggregated insight is included in the given subset of insights to be presented to the given user in place of the one or more individual insights, and (e) causing a client station associated with the given user to display a visualization of the given subset of insights to be presented to the given user that includes (i) an insights pane that provides a high-level overview of the given subset of insights and (ii) a details pane that provides additional details regarding a selected one of the given subset of insights.

In another aspect, disclosed herein is a computing system that comprises a network interface configured to communicatively couple the computing system to a plurality of data sources, at least one processor, a non-transitory computer-readable medium, and program instructions stored on the non-transitory computer-readable medium that are executable by the at least one processor to cause the computing system to carry out the functions disclosed herein, including but not limited to the functions of the foregoing method.

In yet another aspect, disclosed herein is a non-transitory computer-readable medium comprising program instructions that are executable to cause a computing system to carry out the functions disclosed herein, including but not limited to the functions of the foregoing method.

One of ordinary skill in the art will appreciate these as well as numerous other aspects in reading the following disclosure.

BRIEF DESCRIPTION OF THE DRAWINGS

FIG. 7A depicts a simplified version of an example insights view rendered at a client station.

FIG. 7F depicts a simplified version of an example recent-events panel rendered at a client station.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. EXAMPLE NETWORK CONFIGURATION

Figure 1:
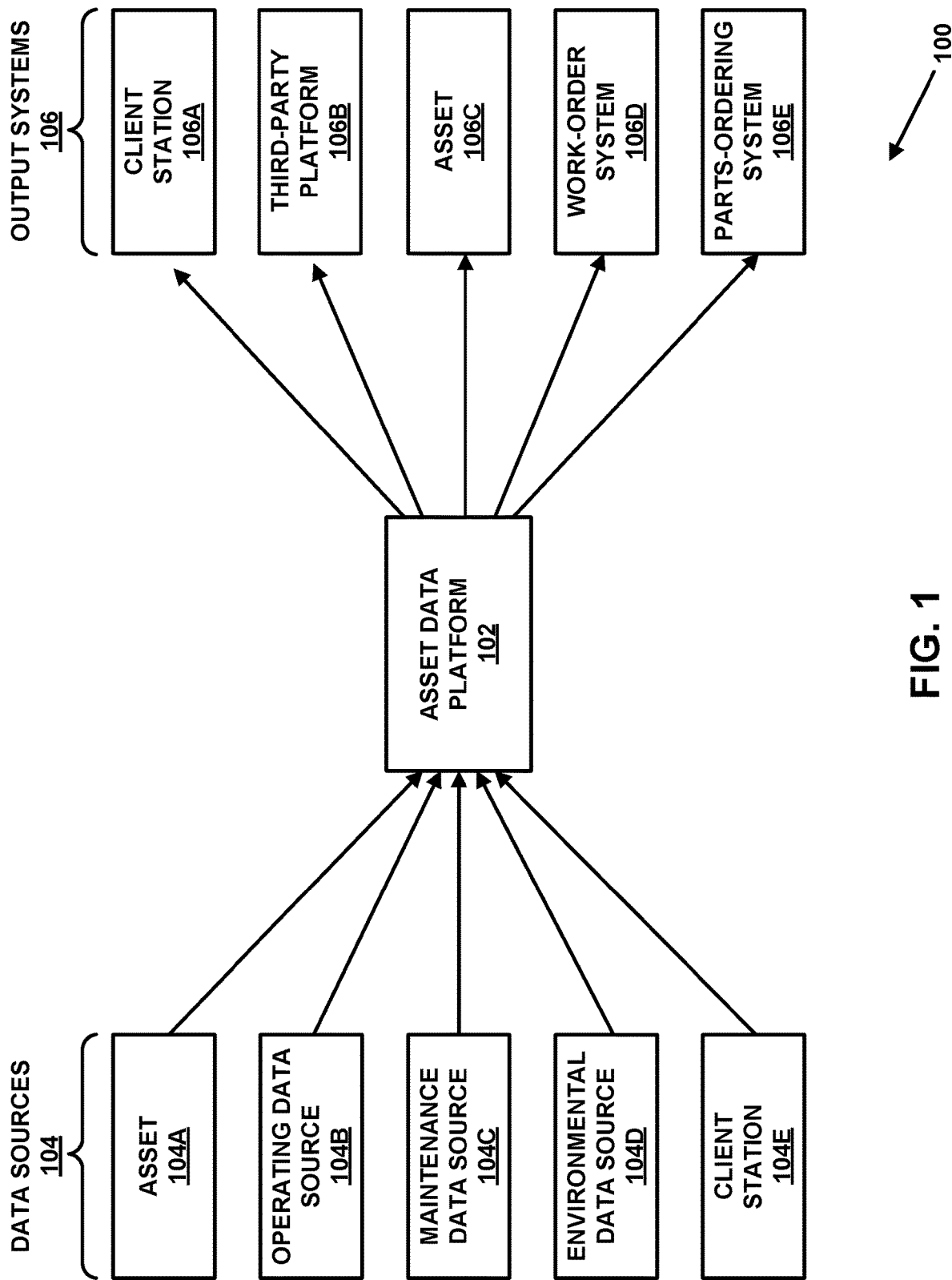
FIG. 1 depicts an example network configuration in which example embodiments may be implemented.

Turning now to the figures, FIG. 1 depicts an example network configuration 100 in which example embodiments may be implemented. As shown, network configuration 100 includes at its core a central computing system 102, which may be communicatively coupled to one or more data sources 104 and one or more output systems 106 via respective communication paths. In such an arrangement, central computing system 102 may generally serve as an "asset data platform" (also referred to herein as a "data analytics platform") that is configured to perform functions to facilitate the monitoring, analysis, and/or management of various types of "assets," which may take various forms.

For instance, some representative types of assets that may be monitored by asset data platform 102 may include transport vehicles (e.g., locomotives, aircrafts, passenger vehicles, trucks, ships, etc.), equipment for construction, mining, farming, or the like (e.g., excavators, bulldozers, dump trucks, earth movers, etc.), manufacturing equipment (e.g., robotics devices, conveyor systems, and/or other assembly-line machines), electric power generation equipment (e.g., wind turbines, gas turbines, coal boilers), petroleum production equipment (e.g., gas compressors, distillation columns, pipelines), and data network nodes (e.g., personal computers, routers, bridges, gateways, switches, etc.), among other examples. Additionally, an asset may have various other characteristics that more specifically define the type of asset, examples of which may include the asset's brand, make, model, vintage, and/or software version, among other possibilities. In this respect, depending on the implementation, the assets monitored by asset data platform 102 may either be of the same type or various different types. Additionally yet, the assets monitored by asset data platform 102 may be arranged into one or more "fleets" of assets, which refers to any group or two or more assets that are related to one another in some manner (regardless of whether such assets are of the same type).

Broadly speaking, asset data platform 102 may comprise one or more computing systems that have been provisioned with software for carrying out one or more of the platform functions disclosed herein, including but not limited to receiving data related to the operation and/or management of assets (broadly referred to herein as "asset-related data") from data sources 104, performing data ingestion and/or data analytics operations on the asset-related data received from asset data sources 104, and then outputting data and/or instructions related to the operation and/or management of assets to output systems 106. The one or more computing systems of asset data platform 102 may take various forms and be arranged in various manners.

For instance, as one possibility, asset data platform 102 may comprise computing infrastructure of a public, private, and/or hybrid cloud (e.g., computing and/or storage clusters) that has been provisioned with software for carrying out one or more of the platform functions disclosed herein. In this respect, the entity that owns and operates asset data platform 102 may either supply its own cloud infrastructure or may obtain the cloud infrastructure from a third-party provider of "on demand" computing resources, such as Amazon Web Services (AWS), Microsoft Azure, Google Cloud, Alibaba Cloud, or the like. As another possibility, asset data platform 102 may comprise one or more dedicated servers that have been provisioned with software for carrying out one or more of the platform functions disclosed herein. Other implementations of asset data platform 102 are possible as well.

Further, in practice, the software for carrying out the disclosed platform functions may take various forms. As one possibility, the platform software may comprise executable program instructions that cause asset data platform 102 to perform data ingestion operations on asset-related data received from data sources 104, including but not limited to extraction, transformation, and loading operations, among other examples. As another possibility, the platform software may comprise executable program instructions that cause asset data platform 102 to perform data analytics operations based on the asset-related data received from data sources 104, including but not limited to failure prediction, anomaly detection, fuel management, noise filtering, image analysis, predictive recommendations, and label correction, among other examples. As yet another possibility, the platform software may comprise executable program instructions that cause asset data platform 102 to output data and/or instructions related to the operation and/or management of assets for receipt by one or more output systems 106.

As one specific example, the platform software may comprise executable program instructions for outputting data related to the operation and/or management of assets that is to be presented to a user (e.g., asset-related data received from data sources 104 and/or the results of the data analytics operations performed by asset data platform 102), and these program instructions may take the form of discrete "applications" that are each tailored for particular end users, particular groups of assets, and/or particular purposes. Some representative examples of such applications may include an asset performance management application, an asset fleet management application, a service optimization application, and an asset dealer operations application, among other possibilities.

The software for carrying out the disclosed platform functions may take various other forms as well.

As described above, asset data platform 102 may be configured to receive asset-related data from one or more data sources 104. These data sources—and the asset-related data output by such data sources—may take various forms. To illustrate, FIG. 1 shows some representative examples of data sources 104 that may provide asset-related data to asset data platform 102, which are discussed in further detail below. However, it should be understood that these example data sources are merely provided for purposes of illustration, and that asset data platform 102 may be configured to receive asset-related data from other types of data sources as well.

For instance, one type of data source 104 may take the form of an asset 104A, which may be equipped with components that are configured to capture data that is indicative of the operation of the asset—referred to herein as "operating data"—and then transmit the asset's operating data to asset data platform 102 over the respective communication path between asset 104A and asset data platform 102. In this respect, asset 104A may take any of the various forms described above, including but not limited to a transport vehicle, heavy equipment, manufacturing equipment, electric power generation equipment, and/or petroleum production equipment, among other types of assets. Further, it should be understood that the components of asset 104A for capturing and transmitting the asset's operating data either may be included as part of asset 104A as manufactured or may be affixed to asset 104A at some later date, among other possibilities.

The operating data that is captured and sent by asset 104A may take various forms. As one possibility, an asset's operating data may include sensor data that comprises time-series measurements for certain operating parameters of the asset, examples of which may include speed, velocity, acceleration, location, weight, temperature, pressure, friction, vibration, power usage, throttle position, fluid usage, fluid level, voltage, current, magnetic field, electric field, presence or absence of objects, current position of a component, and power generation, among many others. As another possibility, an asset's operating data may include abnormal-conditions data that indicates occurrences of discrete abnormal conditions at the asset, examples of which include fault codes that indicate the occurrence of certain faults at the asset (e.g., when an operating parameter exceeds a threshold), asset shutdown indicators, and/or other types of abnormal-condition indicators. As yet another possibility, an asset's operating data may include data that has been derived from the asset's sensor data and/or abnormal-conditions data, examples of which may include "roll-up" data (e.g., an average, mean, median, etc. of the raw measurements for an operating parameter over a given time window) and "features" data (e.g., data values that are derived based on the raw measurements of two or more of the asset's operating parameters). An asset's operating data may take various other forms as well.

In practice, an asset's operating data may also include or be associated with data that identifies the origin of the operating data. This origin data may take various forms. For example, such origin data may include identifying information for the originating asset (e.g., an asset ID and/or data indicating the asset's type, brand, make, model, age, software version, etc.) and/or identifying information for the component of asset 104A that captured the operating data (e.g., a sensor ID), among other possibilities. As another example, such origin data may include data indicating the time at which the operating data was captured (e.g., a timestamp) and/or the asset's location when the operating data was captured (e.g., GPS coordinates), to the extent that such location is not otherwise included in the operating data. Asset data platform 102 may receive other types of data from asset 104A as well.

Further, asset data platform 102 may be configured to receive operating data from asset 104A in various manners. As one possibility, asset 104A may be configured to send its operating data to asset data platform 102 in a batch fashion, in which case asset data platform 102 may receive periodic transmissions of operating data from asset 104A (e.g., on an hourly, daily, or weekly basis). As another possibility, asset data platform 102 may receive operating data from asset 104A in a streaming fashion as such operating data is captured by asset 104A. As yet another possibility, asset data platform 102 may receive operating data from asset 104A in response to sending a request for such data to asset 104A, in which case asset data platform 102 may be configured to periodically send requests for operating data to asset 104A. Asset data platform 102 may be configured to receive operating data from asset 104A in other manners as well.

Another type of data source 104 may take the form of operating data source 104B, which may comprise a computing system that is configured to receive operating data from one or more upstream sources of operating data (e.g., assets) and then provide this operating data to asset data platform 102 over the respective communication path between operating data source 104B and asset data platform 102. Such an operating data source may take various forms. As one possibility, operating data source 104B may comprise an existing data platform of a third-party organization that receives and/or maintains operating data for one or more assets, such as a data platform operated by an asset owner, an asset dealer, an asset manufacturer, an asset repair shop, or the like. As another possibility, operating data source 104B may comprise an intermediary system that compiles operating data from a plurality of upstream sources of operating data and then provides that compiled operating data to asset data platform 102. For example, such an intermediary system may take the form of a computing system located in proximity to a fleet of assets (e.g., at a job site or wind farm) that is configured to compile operating data for the fleet of assets or a computing system that is configured to compile operating data maintained by several third-party data platforms, among other possibilities. Operating data source 104B may take other forms as well.

The operating data that is maintained and sent by operating data source 104B may take various forms, including but not limited to any of the forms described above. In addition to the operating data received from the one or more upstream sources, the operating data provided by operating data source 104B may also include additional operating data that is generated by operating data source 104B itself, such as operating data that operating data sources 104B derives based on the operating data received from the one or more upstream sources (e.g., abnormal-conditions data, roll-up data, features data, etc.).

Further, as with asset 104A, asset data platform 102 may be configured to receive operating data from operating data source 104B in various manners. As one possibility, operating data source 104B may be configured to send its operating data to asset data platform 102 in a batch fashion, in which case asset data platform 102 may receive periodic transmissions of operating data from operating data source 104B (e.g., on an hourly, daily, or weekly basis). As another possibility, asset data platform 102 may receive operating data from operating data source 104B in a streaming fashion as such operating data is received and/or otherwise generated by operating data source 104B. As yet another possibility, asset data platform 102 may receive operating data from operating data source 104B in response to sending a request for such data to operating data source 104B, in which case asset data platform 102 may be configured to periodically send requests for operating data to operating data source 104B. As still another possibility, asset data platform 102 may receive operating data from operating data source 104B by accessing an Application Programming Interface (API) that has been made available by operating data source 104B, subscribing to a service provided by operating data source 104B, or the like. Asset data platform 102 may be configured to receive operating data from operating data source 104B in other manners as well.

Yet another type of data source 104 may take the form of an asset maintenance data source 104C, which may comprise a computing system that is configured to generate and/or receive data related to the maintenance of a plurality of assets—referred to herein as "maintenance data"—and then send this maintenance data to asset data platform 102 over the respective communication path between asset maintenance data source 104C and asset data platform 102. In this respect, asset maintenance data source 104C may take various forms. As one possibility, asset maintenance data source 104C may comprise an existing data platform of a third-party organization that is interested in tracking the maintenance of assets, such as an asset owner, asset dealer, asset manufacturer, asset repair shop, or the like. As another possibility, asset maintenance data source 104C may comprise an intermediary system that compiles asset maintenance data from multiple upstream sources (e.g., multiple repair shops) and then provides that compiled maintenance data to asset data platform 102. Asset maintenance data source 104C may take other forms as well.

The asset maintenance data that is maintained and sent by asset maintenance data source 104C may take various forms. As one example, the asset maintenance data may include details regarding inspections, maintenance, servicing, and/or repairs that have been performed or are scheduled to be performed on assets (e.g., work order data). As another example, the asset maintenance data may include details regarding known occurrences of failures at assets (e.g., date of failure occurrence, type of failure occurrence, etc.). Other examples are possible as well. As with the operating data, the asset maintenance data may also include or be associated with data indicating the origins of the asset maintenance data (e.g., source identifier, timestamp, etc.).

Further, asset data platform 102 may be configured to receive asset maintenance data from asset maintenance data source 104C in various manners, including but not limited to any of the manners discussed above with respect to operating data source 104B.

Still another type of data source 104 may take the form of environmental data source 104D, which may comprise a computing system that is configured to generate and/or receive data about an environment in which assets operate—referred to herein as "environmental data"—and then send this data to asset data platform 102 over the respective communication path between environmental data source 104D and asset data platform 102. In this respect, environmental data source 104D—and the environmental data provided thereby—may take various forms.

As one possibility, environmental data source 104D may take the form of a weather data source that provides information regarding the weather at locations where assets operate (e.g., ambient temperature, air pressure, humidity, wind direction, wind speed, etc.). As another possibility, environmental data source 104D may take the form of a geospatial data source that provides information regarding the geography and/or topology at locations where assets operate. As yet another possibility, environmental data source 104D may take the form of a satellite image data source that provides satellite imagery for locations where assets operate. As still another possibility, environmental data source 104D may take the form of a traffic data source that provides information regarding ground, air, and/or water traffic at locations where assets operate. Environmental data source 104D may take other forms as well.

Further, in practice, asset data platform 102 may be configured to receive environmental data from asset environmental data source 104D in various manners, including but not limited to any of the manners discussed above with respect to operating data source 104B.

Another type of data source 104 may take the form of client station 104E, which may comprise any computing device that is configured to receive user input related to the operation and/or management of assets (e.g., information entered by a fleet operator, a repair technician, or the like) and then send that user input to asset data platform 102 over the respective communication path between client station 104E and asset data platform 102. In this respect, client station 104E may take any of various forms, examples of which may include a desktop computer, a laptop, a netbook, a tablet, a smartphone, and/or a personal digital assistant (PDA), among other possibilities.

The user input that is entered into client station 104E and sent to asset data platform 102 may comprise various different kinds of information, including but not limited to the kinds of information discussed above with respect to the other data sources. For instance, as one possibility, the user input may include certain kinds of operating data, maintenance data, and/or environmental data that may be input into asset data platform 102 by a user rather than being received from one of the aforementioned data sources. As another possibility, the user input may include certain user-defined settings or logic that is to be used by asset data platform 102 when performing data ingestion and/or data analytics operations. The user input that is entered into client station 104E and sent to asset data platform 102 may take various other forms as well.

The aforementioned data sources 104 are merely provided for purposes of illustration, and it should be understood that the asset data platform's data sources may take various other forms as well. For instance, while FIG. 1 shows several different types of data sources 104, it should be understood that asset data platform 102 need not be configured to receive asset-related data from all of these different types of data sources, and in fact, asset data platform 102 could be configured to receive asset-related data from as little as a single data source 104. Further, while data sources 104A-E have been shown and described separately, it should be understood that these data sources may be combined together as part of the same physical computing system (e.g., an organization's existing data platform may serve as both operating data source 104B and maintenance data source 104C). Further yet, it should be understood that asset data platform 102 may be configured to receive other types of data related to the operation and/or management of assets as well, examples of which may include asset management data (e.g., route schedules and/or operational plans), enterprise data (e.g., point-of-sale (POS) data, customer relationship management (CRM) data, enterprise resource planning (ERP) data, etc.), and/or financial markets data, among other possibilities.

As shown in FIG. 1, asset data platform 102 may also be configured to output asset-related data and/or instructions for receipt by one or more output systems 106. These output systems—and the data and/or instructions provided to such output systems—may take various forms. To illustrate, FIG. 1 shows some representative examples of output systems 106 that may receive asset-related data and/or instructions from asset data platform 102, which are discussed in further detail below. However, it should be understood that these example output systems are merely provided for purposes of illustration, and that asset data platform 102 may be configured to output asset-related data and/or instructions to other types of output systems as well.

For instance, one type of output system 106 may take the form of client station 106A, which may comprise any computing device that is configured to receive asset-related data from asset data platform 102 over the respective communication path between client station 106A and asset data platform 102 and then present such data to a user (e.g., via a front-end application that is defined by asset data platform 102). In this respect, client station 106A may take any of various forms, examples of which may include a desktop computer, a laptop, a netbook, a tablet, a smartphone, and/or a PDA, among other possibilities. Further, it should be understood that client station 106A could either be a different device than client station 104E or could be the same device as client station 104E.

The asset-related data that is output for receipt by client station 106A may take various forms. As one example, this asset-related data may include a restructured version of asset-related data that was received by asset data platform 102 from one or more data sources 104 (e.g., operating data, maintenance data, etc.). As another example, this asset-related data may include data that is generated by asset data platform 102 based on the asset-related data received from data sources 104, such as data resulting from the data analytics operations performed by asset data platform 102 (e.g., predicted failures, recommendations, alerts, etc.). Other examples are possible as well.

Along with the asset-related data that is output for receipt by client station 106A, asset data platform 102 may also output associated data and/or instructions that define the visual appearance of a front-end application (e.g., a graphical user interface (GUI)) through which the asset-related data is to be presented on client station 106A. Such data and/or instructions for defining the visual appearance of a front-end application may take various forms, examples of which may include Hypertext Markup Language (HTML), Cascading Syle Sheets (CSS), and/or JavaScript, among other possibilities. However, depending on the circumstance, it is also possible that asset data platform 102 may output asset-related data to client station 106A without any associated data and/or instructions for defining the visual appearance of a front-end application.

Further, client station 106A may receive asset-related data from asset data platform 102 in various manners. As one possibility, client station 106A may send a request to asset data platform 102 for certain asset-related data and/or a certain front-end application, and client station 106A may then receive asset-related data in response to such a request. As another possibility, asset data platform 102 may be configured to "push" certain types of asset-related data to client station 106A, such as scheduled or event-based alerts, in which case client station 106A may receive asset-related data from asset data platform 102 in this manner. As yet another possibility, asset data platform 102 may be configured to make certain types of asset-related data available via an API, a service, or the like, in which case client station 106A may receive asset-related data from asset data platform 102 by accessing such an API or subscribing to such a service. Client station 106A may receive asset-related data from asset data platform 102 in other manners as well.

Another type of output system 106 may take the form of a data platform 106B operated by a third-party organization interested in the operation and/or management of assets, such as an asset owner, an asset dealer, an asset manufacturer, an asset repair shop, or the like. For instance, a third-party organization such as this may have its own data platform 106B that already enables users to access and/or interact with asset-related data through front-end applications that have been created by the third-party organization, but data platform 106B may not be programmed with the capability to ingest certain types of asset-related data or perform certain types of data analytics operations. In such a scenario, asset data platform 102 may be configured to output certain asset-related data for receipt by data platform 106B.

The asset-related data that is output for receipt by data platform 106B may take various forms, including but not limited any of the forms described above in connection with the output to client station 106A. However, unlike for client station 104A, the asset-related data that is output for receipt by data platform 106B typically need not include any associated data and/or instructions for defining the visual appearance of a front-end application, because data platform 106B may be performing operations on the asset-related data from asset data platform 102 beyond presenting it to a user via a front-end application.

Further, data platform 106B may receive asset-related data from asset data platform 102 in various manners, including but not limited to any of the manners discussed above with respect to client station 106A (e.g., by sending a request to asset data platform 102, having data "pushed" by asset data platform, or accessing an API or service provided by asset data platform 102).

Yet another type of output system 106 may take the form of asset 106C, which may be equipped with components that are configured to receive asset-related data and/or instructions from asset data platform 102 and then act in accordance with the received data and/or instructions. In this respect, asset 106C may take any of the various forms described above, including but not limited to a transport vehicle, heavy equipment, manufacturing equipment, electric power generation equipment, and/or petroleum production equipment, among other types of assets. Further, it should be understood that asset 106C could either be a different asset than asset 104A or could be the same asset as asset 104A.

The asset-related data and/or instructions that are output for receipt by asset 106C may take various forms. As one example, asset data platform 102 may be configured to send asset 106C certain data that has been generated by asset data platform 102 based on the asset-related data received from data sources 104, such as data resulting from a data analytics operation performed by asset data platform 102 (e.g., predicted failures, recommendations, alerts, etc.), in which case asset 106C may receive this data and then potentially adjust its operation in some way based on the received data. As another example, asset data platform 102 may be configured to generate and send an instruction for asset 106C to adjust its operation in some way (e.g., based on the asset-related data received from data sources 104), in which case asset 106C may receive this instruction and then potentially adjust its operation in accordance with the instruction. As yet another example, asset data platform 102 may be configured to generate and send an instruction for asset 106C to perform a data analytics operation locally at asset 106C, in which case asset 106C may receive the instruction and then locally perform the data analytics operation. In some cases, in conjunction with sending asset 106C an instruction to perform a data analytics operation, asset data platform 102 may also provide asset 106C with executable program instructions and/or program data that enable asset 106C to perform the data analytics operation (e.g., a predictive model). However, in other cases, asset 106C may already be provisioned with executable program instructions for performing the data analytics operation. Other examples are possible as well.

Further, in practice, asset 106C may receive asset-related data and/or instructions from asset data platform 102 in various manners, including but not limited to any of the manners discussed above with respect to client station 106A.

Still another type of output system 106 may take the form of work-order system 106D, which may comprise a computing system that is configured to receive asset-related data and/or instructions from asset data platform 102 over the respective communication path between work-order system 106D and asset data platform 102 and then generate a work order in accordance with the received data and/or instructions.

A further type of output system 106 may take the form of parts-ordering system 106E, which may comprise a computing system that is configured to receive asset-related data and/or instructions from asset data platform 102 over the respective communication path between parts-ordering system 106E and asset data platform 102 and then generate a parts order in accordance with the received data and/or instructions.

The aforementioned output systems 106 are merely provided for purposes of illustration, and it should be understood that output systems in communication with asset data platform 102 may take various other forms as well. For instance, while FIG. 1 shows several different types of output systems 106, it should be understood that asset data platform 102 need not be configured to output asset-related data and/or instructions for receipt by all of these different types of output systems, and in fact, asset data platform 102 could be configured to output asset-related data and/or instructions for receipt by as little as a single output system 106. Further, while output systems 106A-E have been shown and described separately, it should be understood that these output systems may be combined together as part of the same physical computing system. Further yet, it should be understood that asset data platform 102 may be configured to output asset-related data and/or instructions for receipt by other types of output systems as well.

As discussed above, asset data platform 102 may communicate with the one or more data sources 104 and one or more output systems 106 over respective communication paths. Each of these communication paths may generally comprise one or more communication networks and/or communications links, which may take any of various forms. For instance, each respective communication path with asset data platform 102 may include any one or more of point-to-point links, Personal Area Networks (PANs), Local-Area Networks (LANs), Wide-Area Networks (WANs), such as the Internet or cellular networks, cloud networks, and/or operational technology (OT) networks, among other possibilities. Further, the communication networks and/or links that make up each respective communication path with asset data platform 102 may be wireless, wired, or some combination thereof, and may carry data according to any of various different communication protocols.

Although not shown, the respective communication paths with asset data platform 102 may also include one or more intermediate systems. For example, it is possible that a given data source 104 may send asset-related data to one or more intermediary systems, such as an aggregation system, and asset data platform 102 may then be configured to receive the asset-related data from the one or more intermediary systems. As another example, it is possible that asset data platform 102 may communicate with a given output system 106 via one or more intermediary systems, such as a host server (not shown). Many other configurations are also possible.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

II. EXAMPLE PLATFORM

Figure 2:
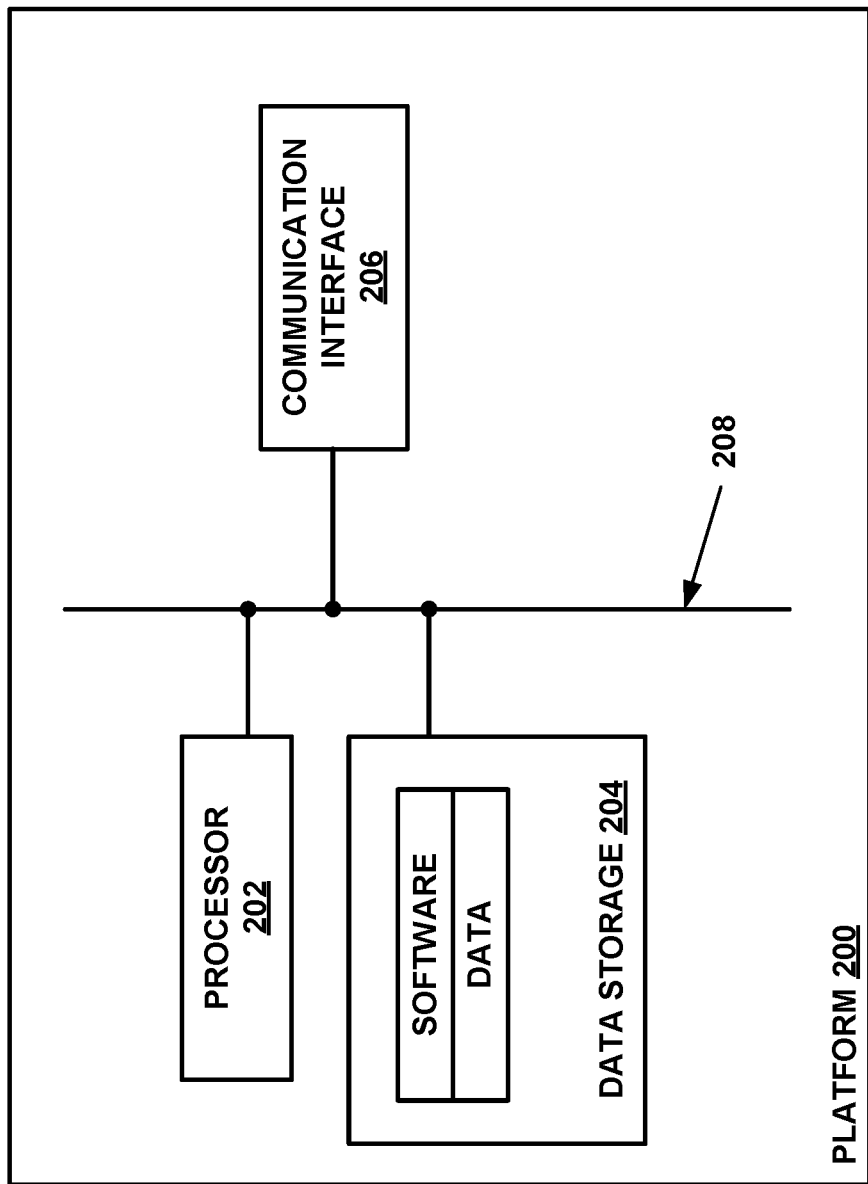
FIG. 2 depicts a simplified block diagram of an example asset data platform from a structural perspective.

FIG. 2 is a simplified block diagram illustrating some structural components that may be included in an example computing platform 200, which could serve as the asset data platform 102 in FIG. 1. In line with the discussion above, platform 200 may generally comprise one or more computer systems (e.g., one or more servers), and these one or more computer systems may collectively include at least a processor 202, data storage 204, and a communication interface 206, all of which may be communicatively linked by a communication link 208 that may take the form of a system bus, a communication network such as a public, private, or hybrid cloud, or some other connection mechanism.

Processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 2, data storage 204 may be provisioned with software components that enable the platform 200 to carry out the functions disclosed herein. These software components may generally take the form of program instructions that are executable by the processor 202 to carry out the disclosed functions, which may be arranged together into software applications, virtual machines, software development kits, toolsets, or the like.

Further, data storage 204 may be arranged to store asset-related data in one or more databases, file systems, or the like. For example, data storage 204 may be configured to store data using technologies such Apache Cassandra, Apache Hadoop, PostgreSQL, and/or MongoDB, among other possibilities. Data storage 204 may take other forms and/or store data in other manners as well.

Communication interface 206 may be configured to facilitate wireless and/or wired communication with data sources and output systems, such as data sources 104 and output systems 106 in FIG. 1. Additionally, in an implementation where platform 200 comprises a plurality of physical computing devices connected via a network, communication interface 206 may be configured to facilitate wireless and/or wired communication between these physical computing devices (e.g., between computing and storage clusters in a cloud network). As such, communication interface 206 may take any suitable form for carrying out these functions, examples of which may include an Ethernet interface, a serial bus interface (e.g., Firewire, USB 2.0, etc.), a chipset and antenna adapted to facilitate wireless communication, and/or any other interface that provides for wireless and/or wired communication. Communication interface 206 may also include multiple communication interfaces of different types. Other configurations are possible as well.

Although not shown, platform 200 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with platform 200.

It should be understood that platform 200 is one example of a computing platform that may be used with the embodiments described herein. Numerous other arrangements are possible and contemplated herein. For instance, other computing platforms may include additional components not pictured and/or more or less of the pictured components.

Figure 3:
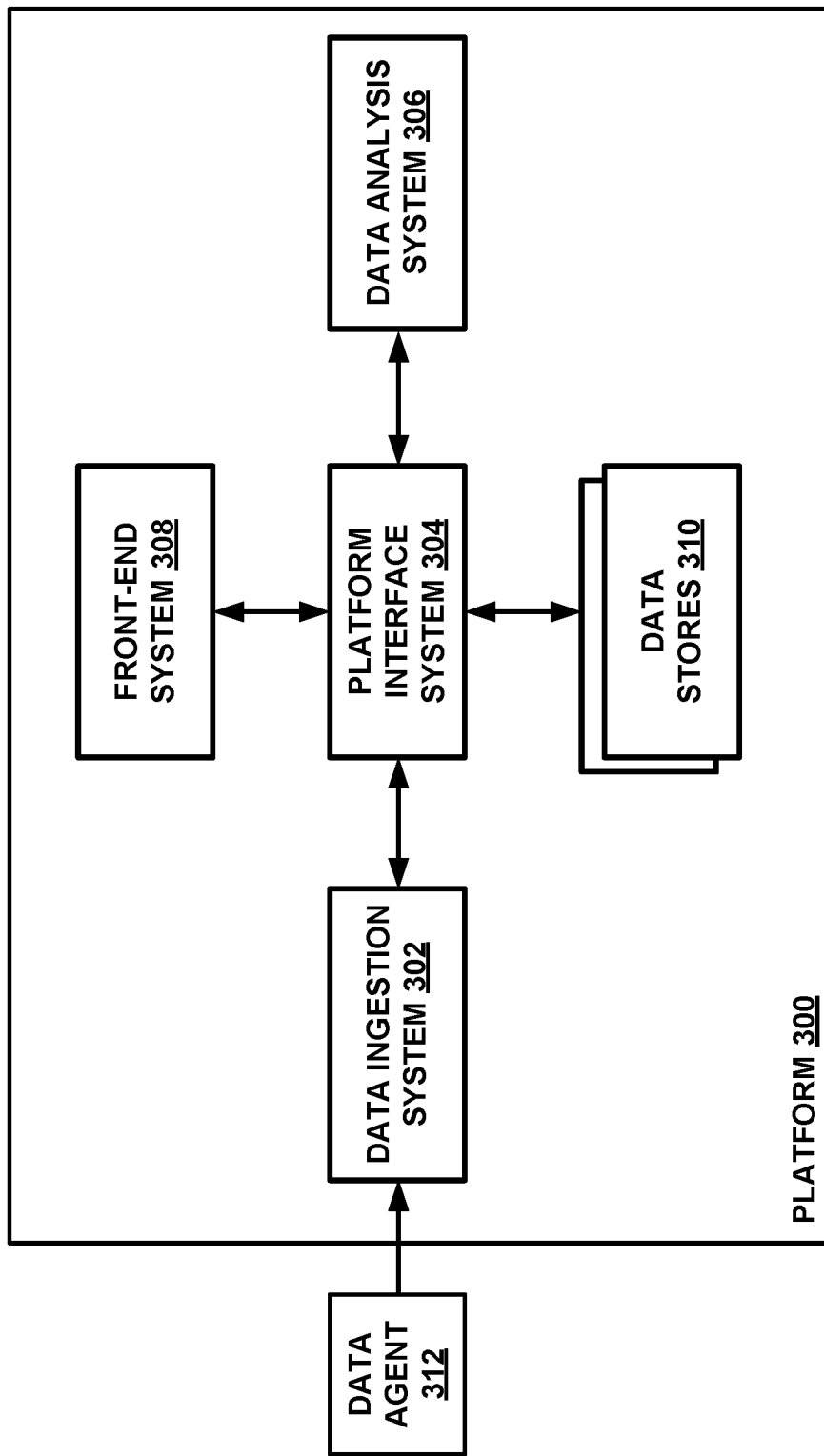
FIG. 3 depicts a simplified block diagram of an example asset data platform from a functional perspective.

Referring now to FIG. 3, another simplified block diagram is provided to illustrate some functional systems that may be included in an example platform 300. For instance, as shown, the example platform 300 may include a data ingestion system 302, a platform interface system 304, a data analysis system 306, a front-end system 308, and one or more data stores 310, each of which comprises a combination of software and hardware that is configured to carry out particular functions. In line with the discussion above, these functional systems may be implemented on one or more computing systems, which may take the form of computing infrastructure of a public, private, and/or hybrid cloud or one or more dedicated servers, among other possibilities.

At a high level, data ingestion system 302 may be configured to ingest asset-related data received from the platform's one or more data sources, transform the ingested data into a standardized structure, and then pass the ingested data to platform interface system 304. In this respect, the function of ingesting received data may be referred to as the "extraction" (or "acquisition") stage within data ingestion system 302, the function of transforming the ingested data into a desired structure may be referred to as the "transformation" stage within data ingestion system 302, and the function of passing the ingested data to platform interface system 304 may be referred to as the "load" stage within data ingestion system 302. (Alternatively, these functions may collectively be referred to as the ETL stage). In some embodiments, data ingestion system 302 may also be configured to enhance the ingested data before passing it to platform interface system 304. This function of enhancing the ingested data may be referred to as the "enhancement" stage within data ingestion system 302. However, data ingestion system 302 may take various other forms and perform various other functions as well.

At the extraction stage, data ingestion system 302 may be configured to receive and ingest various types of asset-related data from various types of data sources, including but not limited to the types of asset-related data and data sources 104 discussed above with reference to FIG. 1. Further, in line with the discussion above, data ingestion system 302 may be configured to receive asset-related data from a data source in various manners. For instance, as one possibility, data ingestion system 302 may be configured to receive batch transmissions of asset-related data from a data source. As another possibility, data ingestion system 302 may be configured to receive asset-related data from a data source in a streaming fashion. As yet another possibility, data ingestion system 302 may be configured to receive asset-related data from a data source in response to sending a request for such data to the data source, in which case data ingestion system 302 may be configured to periodically send requests for asset-related data to the data source. As still another possibility, data ingestion system 302 may receive asset-related data from a data source by subscribing to a service provided by the data source (e.g., via an API or the like). Data ingestion system 302 may be configured to receive asset-related data from a data source in other manners as well.

Before data ingestion system 302 receives asset-related data from certain data sources, there may also be some configuration that needs to place at such data sources. For example, a data source may be configured to output the particular set of asset-related data that is of interest to platform 300. To assist with this process, the data source may be provisioned with a data agent 312, which generally comprises a software component that functions to access asset-related data at the given data source, place the data in the appropriate format, and then facilitate the transmission of that data to platform 300 for receipt by data ingestion system 302. In other cases, however, the data sources may be capable of accessing, formatting, and transmitting asset-related data to platform 300 without the assistance of a data agent.

Turning to the transformation phase, data ingestion system 302 may generally be configured to map and transform ingested data into one or more predefined data structures, referred to as "schemas," in order to standardize the ingested data. As part of this transformation stage, data ingestion system 302 may also drop any data that cannot be mapped to a schema.

In general, a schema is an enforceable set of rules that define the manner in which data is to be structured in a given system, such as a data platform, a data store, etc. For example, a schema may define a data structure comprising an ordered set of data fields that each have a respective field identifier (e.g., a name) and a set of parameters related to the field's value (e.g., a data type, a unit of measure, etc.). In such an example, the ingested data may be thought of as a sequence of data records, where each respective data record includes a respective snapshot of values for the defined set of fields. The purpose of a schema is to define a clear contract between systems to help maintain data quality, which indicates the degree to which data is consistent and semantically correct.

In some implementations, data ingestion system 302 may also be configured to map and transform different types of asset-related data to different schemas. For instance, if the asset-related data received from different data sources is to be input into different types of data analytics operations that have different input formats, it may be advantageous to map and transform such asset-related data received from the different data sources to different schemas.

As part of the transformation stage, data ingestion system 302 may also be configured to perform various other quality checks on the asset-related data before passing it to platform interface system 304. For example, data ingestion system 302 may assess the reliability (or "health") of certain ingested data and take certain actions based on this reliability, such as dropping any unreliable data. As another example, data ingestion system 302 may "de-dup" certain ingested data by comparing it against data that has already been received by platform 300 and then ignoring or dropping duplicative data. As yet another example, data ingestion system 302 may determine that certain ingested data is related to data already stored in the platform's data stores (e.g., a different version of the same data) and then merge the ingested data and stored data together into one data structure or record. Data ingestion system 302 may perform other types of quality checks as well.

It should also be understood that certain data ingested by data ingestion system 302 may not be transformed to a predefined schema (i.e., it is possible that certain ingested data will be "passed through" without performing any transformation on the data), in which case platform 300 may operate on this ingested data as it exists in its original data structure.

As noted above, in some embodiments, data ingestion system 302 may also include an "enhancement" stage where data ingestion system 302 enhances the ingested data before passing it to platform interface system 304. In this respect, data ingestion system 302 may enhance the ingested data in various manners. For instance, data ingestion system 302 may supplement the ingested data with additional asset-related data that is derived by and/or otherwise accessible to platform 300. Such additional data may take various forms. As one example, if the ingested data comprises sensor data, data ingestion system 302 may be configured to supplement the sensor data with "roll-up" data and/or "features" data that is derived from the sensor data. As another possible example, data ingestion system 302 may generate and append certain "enrichments" to the ingested data, examples of which are described in U.S. application Ser. No. 16/004,652, which is incorporated by reference herein in its entirety. Data ingestion system 302 may enhance the ingested data in other manners as well.

After data ingestion system 302 has performed any appropriate transformation and/or enhancement operations on the ingested data, it may pass the ingested data to platform interface system 304, which may be configured to receive data from data ingestion system 302, store the received data in one or more of data stores 310, and make the data available for consumption by the other functional systems of platform 300—including data analysis system 306 and/or front-end system 308. In this respect, the function of passing the ingested data from data ingestion system 302 to platform interface system 304 may take various forms.

According to an example implementation, data ingestion system 302 may begin by categorizing the ingested data into separate data categories (or "domains") that are to be consumed separately by the platform's other functional systems. In turn, data ingestion system 302 may publish the data within each category to a corresponding interface (e.g., an API or the like) that is provided by platform interface system 304. However, it should be understood that other approaches for passing the ingested data from data ingestion system 302 to platform interface system 304 may be used as well, including the possibility that data ingestion system 302 may simply publish the ingested data to a given interface of platform interface system 304 without any prior categorization of the ingested data.

After platform interface system 304 receives the ingested data from data ingestion system 302, platform interface system 304 may cause that data to be stored at the appropriate data stores 310 within platform 300. For instance, in the event that platform interface system 304 is configured to receive different categories of ingested data, platform interface system 304 may be configured store data from a first category into a first data store 310, store data from a second category into a second data store 310, and so on. In addition, platform interface system 304 may store an archival copy of the ingested data into an archival data store 310. Platform interface system 304 may store the ingested data in other manners as well.

After receiving the ingested data from data ingestion system 302, platform interface system 304 may also make the ingested data available for consumption by the platform's other functional systems—including data analysis system 306 and front-end system 308. In this respect, platform interface system 304 may make the ingested data available for consumption in various manners, including through the use of message queues or the like.

After consuming data from platform interface system 304, data analysis system 306 may generally function to perform data analytics operations on such data and then pass the results of those data analytics operations back to platform interface system 304. These data analytics operations performed by data analysis system 306 may take various forms.

As one possibility, data analysis system 306 may create and/or execute predictive models related to asset operation based on asset-related data received from one or more data sources, such as predictive models that are configured to predict occurrences of failures at an asset. One example of a predictive model that may be created and executed by data analysis system 306 is described in U.S. application Ser. No. 14/732,258, which is incorporated by reference herein in its entirety.

As another possibility, data analysis system 306 may create and/or execute models for detecting anomalies in asset-related data received from one or more data sources. Some examples of anomaly detection models that may be created and executed by data analysis system 306 are described in U.S. application Ser. Nos. 15/367,012 and 15/788,622, which are incorporated by reference herein in their entirety.

As yet another possibility, data analysis system 306 may be configured to create and/or execute other types of data analytics programs based on asset-related data received from one or more data sources, examples of which include data analytics programs that evaluate asset-related data using a set of predefined rules (e.g., threshold-based rules), data analytics programs that generate predictive recommendations, data analytics programs that perform noise filtering, and data analytics programs that perform image analysis, among other possibilities.

The data analytics operations performed by data analysis system 306 may take various other forms as well.

Further, it should be understood that some of the data analytics operations discussed above may involve the use of machine learning techniques, examples of which may include regression, random forest, support vector machines (SVM), artificial neural networks, Naïve Bayes, decision trees, dimensionality reduction, k-nearest neighbor (kNN), gradient boosting, clustering, and association, among other possibilities.

As discussed above, after performing its data analytics operations, data analysis system 306 may then pass the results of those operations back to platform interface system 304, which may store the results in the appropriate data store 310 and make such results available for consumption by the platform's other functional systems—including data analysis system 306 and front-end system 308.

In turn, front-end system 308 may generally be configured to drive front-end applications that may be presented to a user via a client station (e.g., client station 106A). Such front-end applications may take various forms. For instance, as discussed above, some possible front-end applications for platform 300 may include an asset performance management application, an asset fleet management application, a service optimization application, and/or an asset dealer operations application, among other possibilities.

In practice, front-end system 308 may generally function to access certain asset-related data from platform interface system 304 that is to be presented to a user as part of a front-end application and then provide such data to the client station along with associated data and/or instructions that define the visual appearance of the front-end application. Additionally, front-end system 308 may function to receive user input that is related to the front-end applications for platform 300, such as user requests and/or user data. Additionally yet, front-end system 308 may support a software development kit (SDK) or the like that allows a user to create customized front-end applications for platform 300. Front-end system 308 may perform other functions as well.

Platform 300 may also include other functional systems that are not shown. For instance, although not shown, platform 300 may include one or more additional functional systems that are configured to output asset-related data and/or instructions for receipt by other output systems, such as third-party data platforms, assets, work-order systems, parts-ordering systems, or the like.

One of ordinary skill in the art will appreciate that the example platform shown in FIGS. 2-3 is but one example of a simplified representation of the structural components and/or functional systems that may be included in a platform, and that numerous others are also possible. For instance, other platforms may include structural components and/or functional systems not pictured and/or more or less of the pictured structural components and/or functional systems. Moreover, a given platform may include multiple, individual platforms that are operated in concert to perform the operations of the given platform. Other examples are also possible.

III. EXAMPLE ASSET

As discussed above with reference to FIG. 1, asset data platform 102 may be configured to perform functions to facilitate the monitoring, analysis, and/or management of various types of assets, examples of which may include transport vehicles (e.g., locomotives, aircrafts, passenger vehicles, trucks, ships, etc.), equipment for construction, mining, farming, or the like (e.g., excavators, bulldozers, dump trucks, earth movers, etc.), manufacturing equipment (e.g., robotics devices, conveyor systems, and/or other assembly-line machines), electric power generation equipment (e.g., wind turbines, gas turbines, coal boilers), petroleum production equipment (e.g., gas compressors, distillation columns, pipelines), and data network nodes (e.g., personal computers, routers, bridges, gateways, switches, etc.), among other examples.

Broadly speaking, an asset may comprise a combination of one or more electrical, mechanical, electromechanical, and/or electronic components that are designed to perform one or more tasks. Depending on the type of asset, such components may take various forms. For instance, a transport vehicle may include an engine, a transmission, a drivetrain, a fuel system, a battery system, an exhaust system, a braking system, a generator, a gear box, a rotor, and/or hydraulic systems, which work together to carry out the tasks of a transport vehicle. However, other types of assets may include other various other types of components.

Figure 4:
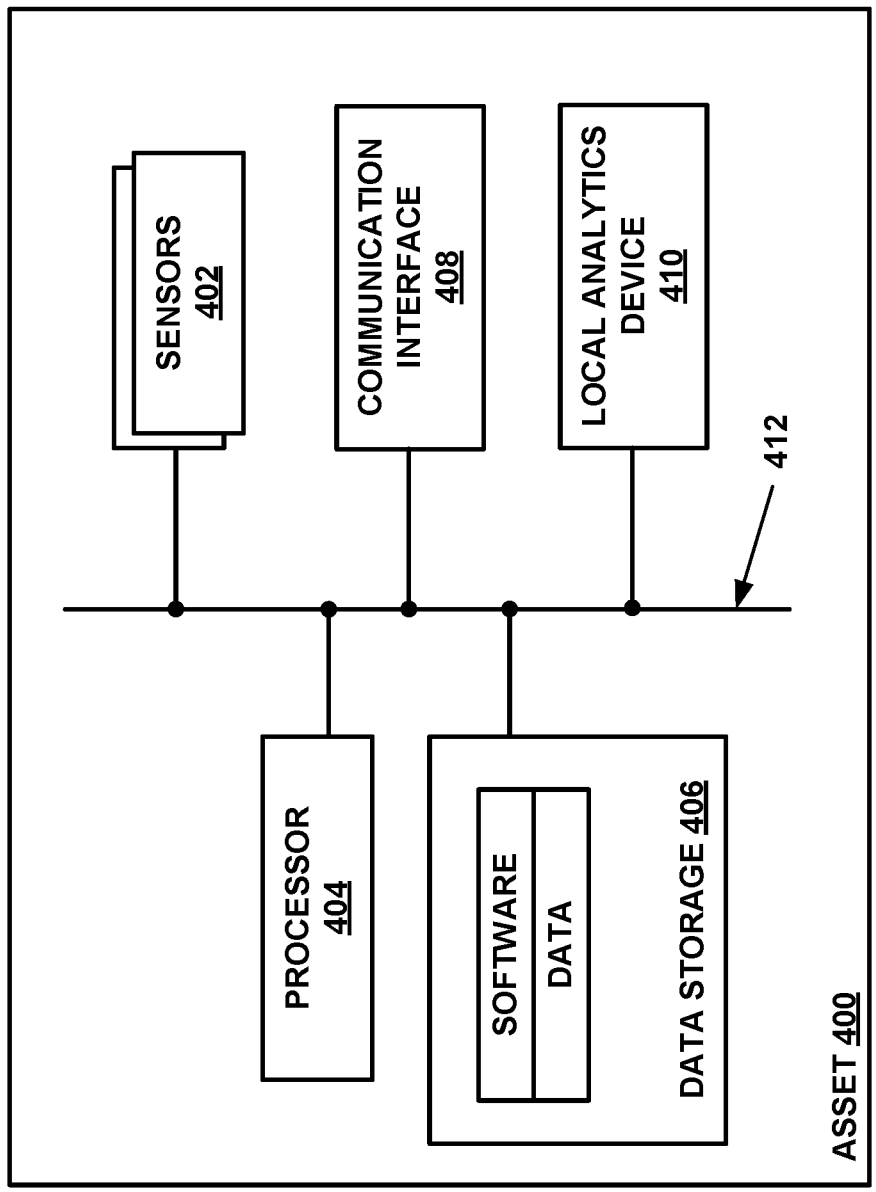
FIG. 4 depicts a simplified block diagram of the on-board components of an example asset.

In addition to the aforementioned components, an asset may also be equipped with a set of on-board components that enable the asset to capture and report operating data. To illustrate, FIG. 4 is simplified block diagram showing some on-board components for capturing and reporting operating data that may be included within or otherwise affixed to an example asset 400. As shown, these on-board components may include sensors 402, a processor 404, data storage 406, a communication interface 408, and perhaps also a local analytics device 410, all of which may be communicatively coupled by a communication link 412 that may take the form of a system bus, a network, or other connection mechanism.

In general, sensors 402 may each be configured to measure the value of a respective operating parameter of asset 400 and then output data that indicates the measured value of the respective operating parameter over time. In this respect, the operating parameters of asset 400 that are measured by sensors 402 may vary depending on the type of asset, but some representative examples may include speed, velocity, acceleration, location, weight, temperature, pressure, friction, vibration, power usage, throttle position, fluid usage, fluid level, voltage, current, magnetic field, electric field, presence or absence of objects, current position of a component, and power generation, among many others.

In practice, sensors 402 may each be configured to measure the value of a respective operating parameter continuously, periodically (e.g., based on a sampling frequency), and/or in response to some triggering event. In this respect, each sensor 402 may have a respective set of operating parameters that defines how the sensor performs its measurements, which may differ on a sensor-by-sensor basis (e.g., some sensors may sample based on a first frequency, while other sensors sample based on a second, different frequency). Similarly, sensors 402 may each be configured to output data that indicates the measured value of its respective operating parameter continuously, periodically (e.g., based on a sampling frequency), and/or in response to some triggering event.

Based on the foregoing, it will be appreciated that sensors 402 may take various different forms depending on the type of asset, the type of operating parameter being measured, etc. For instance, in some cases, a sensor 402 may take the form of a general-purpose sensing device that has been programmed to measure a particular type of operating parameter. In other cases, a sensor 402 may take the form of a special-purpose sensing device that has been specifically designed to measure a particular type of operating parameter (e.g., a temperature sensor, a GPS receiver, etc.). In still other cases, a sensor 402 may take the form of a special-purpose device that is not primarily designed to operate as a sensor but nevertheless has the capability to measure the value of an operating parameter as well (e.g., an actuator). Sensors 402 may take other forms as well.

Processor 404 may comprise one or more processor components, such as general-purpose processors, special-purpose processors, programmable logic devices, controllers, and/or any other processor components now known or later developed. In turn, data storage 406 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc.

As shown in FIG. 4, data storage 406 may be arranged to contain executable program instructions (i.e., software) that cause asset 400 to perform various functions related to capturing and reporting operating data, along with associated data that enables asset 400 to perform these operations. For example, data storage 406 may contain executable program instructions that cause asset 400 to obtain sensor data from sensors 402 and then transmit that sensor data to another computing system (e.g., asset data platform 102). As another example, data storage 406 may contain executable program instructions that cause asset 400 to evaluate whether the sensor data output by sensors 402 is indicative of any abnormal conditions at asset 400 (e.g., by applying logic such as threshold-based rules to the measured values output by sensors 402), and then if so, to generate abnormal-condition data that indicates occurrences of abnormal conditions. The executable program instructions and associated data stored in data storage 406 may take various other forms as well.

Communication interface 408 may be configured to facilitate wireless and/or wired communication between asset 400 and various computing systems, including an asset data platform such as asset data platform 102. As such, communication interface 408 may take any suitable form for carrying out these functions, examples of which may include a chipset and antenna adapted to facilitate wireless communication, an Ethernet interface, a serial bus interface (e.g., Firewire, USB 2.0, etc.), and/or any other interface that provides for wireless and/or wired communication. Communication interface 408 may also include multiple communication interfaces of different types. Other configurations are possible as well. It should also be understood that asset 400 may not be equipped with its own on-board communication interface 408.

In some circumstances, it may also be desirable to perform certain data analytics operations locally at asset 400, rather than relying on a central platform to perform data analytics operations. Indeed, performing data analytics operations locally at asset 400 may reduce the need to transmit operating data to a centralized platform, which may reduce the cost and/or delay associated with performing data analytics operations at the central platform and potentially also increase the accuracy of certain data analytics operations, among other advantages.

In this respect, in some cases, the aforementioned on-board components of asset 400 (e.g., processor 404 and data storage 406) may provide sufficient computing power to locally perform data analytics operations at asset 400, in which case data storage 406 may be provisioned with executable program instructions and associated program data for performing the data analytics operations. However, in other cases, the aforementioned on-board components of asset 400 (e.g., processor 404 and/or data storage 406) may not provide sufficient computing power to locally perform certain data analytics operations at asset 400. In such cases, asset 400 may also optionally be equipped with local analytics device 410, which may comprise a computing device that is capable of performing data analytics operations and other complex operations that go beyond the capabilities of the asset's other on-board components. In this way, local analytics device 410 may generally serve to expand the on-board capabilities of asset 400.

Figure 5:
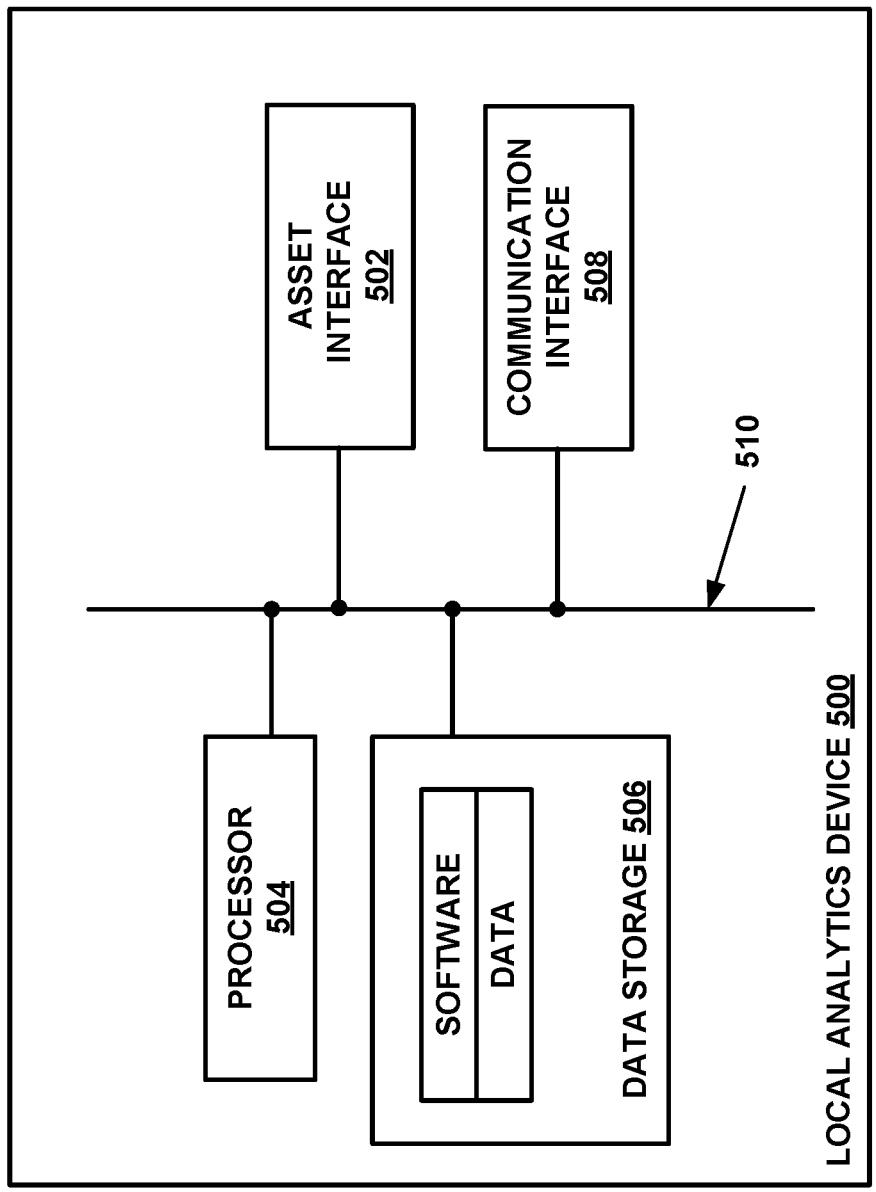
FIG. 5 depicts a simplified block diagram of an example local analytics device.

FIG. 5 illustrates a simplified block diagram showing some components that may be included in an example local analytics device 500. As shown, local analytics device 500 may include an asset interface 502, a processor 504, data storage 506, and a communication interface 508, all of which may be communicatively coupled by a communication link 510 that may take the form of a system bus, a network, or other connection mechanism.

Asset interface 502 may be configured to couple local analytics device 500 to the other on-board components of asset 400. For instance, asset interface 502 may couple local analytics device 500 to processor 404, which may enable local analytics device 500 to receive data from processor 404 (e.g., sensor data output by sensors 402) and to provide instructions to processor 404 (e.g., to control the operation of asset 400). In this way, local analytics device 500 may indirectly interface with and receive data from other on-board components of asset 400 via processor 404. Additionally or alternatively, asset interface 502 may directly couple local analytics device 500 to one or more sensors 402 of asset 400. Local analytics device 500 may interface with the other on-board components of asset 400 in other manners as well.

Processor 504 may comprise one or more processor components that enable local analytics device 500 to execute data analytics programs and/or other complex operations, which may take the form of general-purpose processors, special-purpose processors, programmable logic devices, controllers, and/or any other processor components now known or later developed. In turn, data storage 506 may comprise one or more non-transitory computer-readable storage mediums that enable local analytics device 500 to execute data analytics programs and/or other complex operations, examples of which may include volatile storage mediums such as random-access memory, registers, cache, etc. and non-volatile storage mediums such as read-only memory, a hard-disk drive, a solid-state drive, flash memory, an optical-storage device, etc.

As shown in FIG. 5, data storage 506 may be arranged to contain executable program instructions (i.e., software) that cause local analytics device 500 to perform data analytics operations and/or other complex operations that go beyond the capabilities of the asset's other on-board components, as well as associated data that enables local analytics device 500 to perform these operations.

Communication interface 508 may be configured to facilitate wireless and/or wired communication between local analytics device 500 and various computing systems, including an asset data platform such as asset data platform 102. In this respect, local analytics device 500 may communicate the results of its operations to an asset data platform via communication interface 508, rather than via an on-board communication interface of asset 400. Further, in circumstances where asset 400 is not be equipped with its own on-board communication interface, asset 400 may use communication interface 508 to transmit operating data to an asset data platform. As such, communication interface 508 may take any suitable form for carrying out these functions, examples of which may include a chipset and antenna adapted to facilitate wireless communication, an Ethernet interface, a serial bus interface (e.g., Firewire, USB 2.0, etc.), and/or any other interface that provides for wireless and/or wired communication. Communication interface 508 may also include multiple communication interfaces of different types. Other configurations are possible as well.

In addition to the foregoing, local analytics device 500 may also include other components that can be used to expand the on-board capabilities of an asset. For example, local analytics device 500 may optionally include one or more sensors that are configured to measure certain parameters, which may be used to supplement the sensor data captured by the asset's on-board sensors. Local analytics device 500 may include other types of components as well.

Returning to FIG. 4, although not shown, asset 400 may also be equipped with hardware and/or software components that enable asset 400 to adjust its operation based on asset-related data and/or instructions that are received at asset 400 (e.g., from asset data platform 102 and/or local analytics device 410). For instance, as one possibility, asset 400 may be equipped with one or more of an actuator, motor, value, solenoid, or the like, which may be configured to alter the physical operation of asset 400 in some manner based on commands received from processor 404. In this respect, data storage 406 may additionally be provisioned with executable program instructions that cause processor 404 to generate such commands based on asset-related data and/or instructions received via communication interface 408. Asset 400 may be capable of adjusting its operation in other manners as well.

Further, although not shown, asset 400 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with the on-board components of asset 400.

One of ordinary skill in the art will appreciate that FIGS. 4-5 merely show one example of the components of an asset, and that numerous other examples are also possible. For instance, the components of an asset may include additional components not pictured, may have more or less of the pictured components, and/or the aforementioned components may be arranged and/or integrated in a different manner. Further, one of ordinary skill in the art will appreciate that two or more of the components of asset 400 may be integrated together in whole or in part. Further yet, one of ordinary skill in the art will appreciate that at least some of these components of asset 400 may be affixed or otherwise added to asset 400 after it has been placed into operation.

IV. EXAMPLE OPERATIONS

As noted above, a data analytics platform, such as asset data platform 102, may be configured to perform various computing tasks to facilitate monitoring, analyzing, and/or making predictions about the operation of assets in a real-world operating environment, such as a rail network, a construction or mining site, etc. For instance, an organization that is interested in monitoring and evaluating asset operation may leverage a data analytics platform that is configured to receive data related to asset operation, derive insights related to asset operation based on that data, and then present those insights to users that are responsible for overseeing or otherwise managing the assets that are under evaluation. However, existing data analytics platforms fail to present to a user responsible for overseeing assets derived insights in an effective manner.

For instance, one existing approach for presenting insights to a user responsible for overseeing assets involves presenting the user with a notification (or the like) for every derived insight, which may ultimately result in the user being overwhelmed with notifications to the point that the user is desensitized to the notifications and/or the notifications are no longer usable by the individual. Moreover, existing approaches for presenting a user with notifications (or the like) for derived insights may require the user to navigate through various different applications, GUI screens, or the like to access relevant information and/or functions of interest related to the derived insights. Accordingly, there remains a need for technology that can be used by a data analytics platform to present derived insights to users responsible for overseeing assets in an effective manner.

To address these and other problems with existing data analytics platforms, the data analytics platform disclosed herein is configured with innovative technology for deriving insights related to asset operation (i.e., "asset insights") and presenting these insights to users via a GUI. Advantageously, the disclosed technology may facilitate providing users efficient access to the most relevant information and/or functions of interest related to derived insights, which may improve user experience and perhaps also help to reduce the computing resources that may otherwise be used as users navigate through various different applications, GUI views, or the like to access information and/or functions of interest. In this way, the disclosed technology provides specific improvements over existing technology employed by data analytics platforms for deriving and presenting asset insights.

Example functions that may be carried out by a data analytics platform to derive asset insights and present the insights to users will now be discussed in detail. For purposes of illustration only, the example functions are described in the context of example network configuration 100 of FIG. 1, where asset data platform 102 is a data analytics platform configured to derive asset insights and present the insights to a given user via client station 106A.

To help describe some of these operations, flow diagrams may also be referenced to describe combinations of operations that may be performed. In some cases, each block may represent a module or portion of program code that includes instructions that are executable by a processor to implement specific logical functions or steps in a process. The program code may be stored on any type of computer-readable medium, such as non-transitory computer-readable media. In other cases, each block may represent circuitry that is wired to perform specific logical functions or steps in a process. Moreover, the blocks shown in the flow diagrams may be rearranged into different orders, combined into fewer blocks, separated into additional blocks, and/or removed based upon the particular embodiment.

Figure 6A:
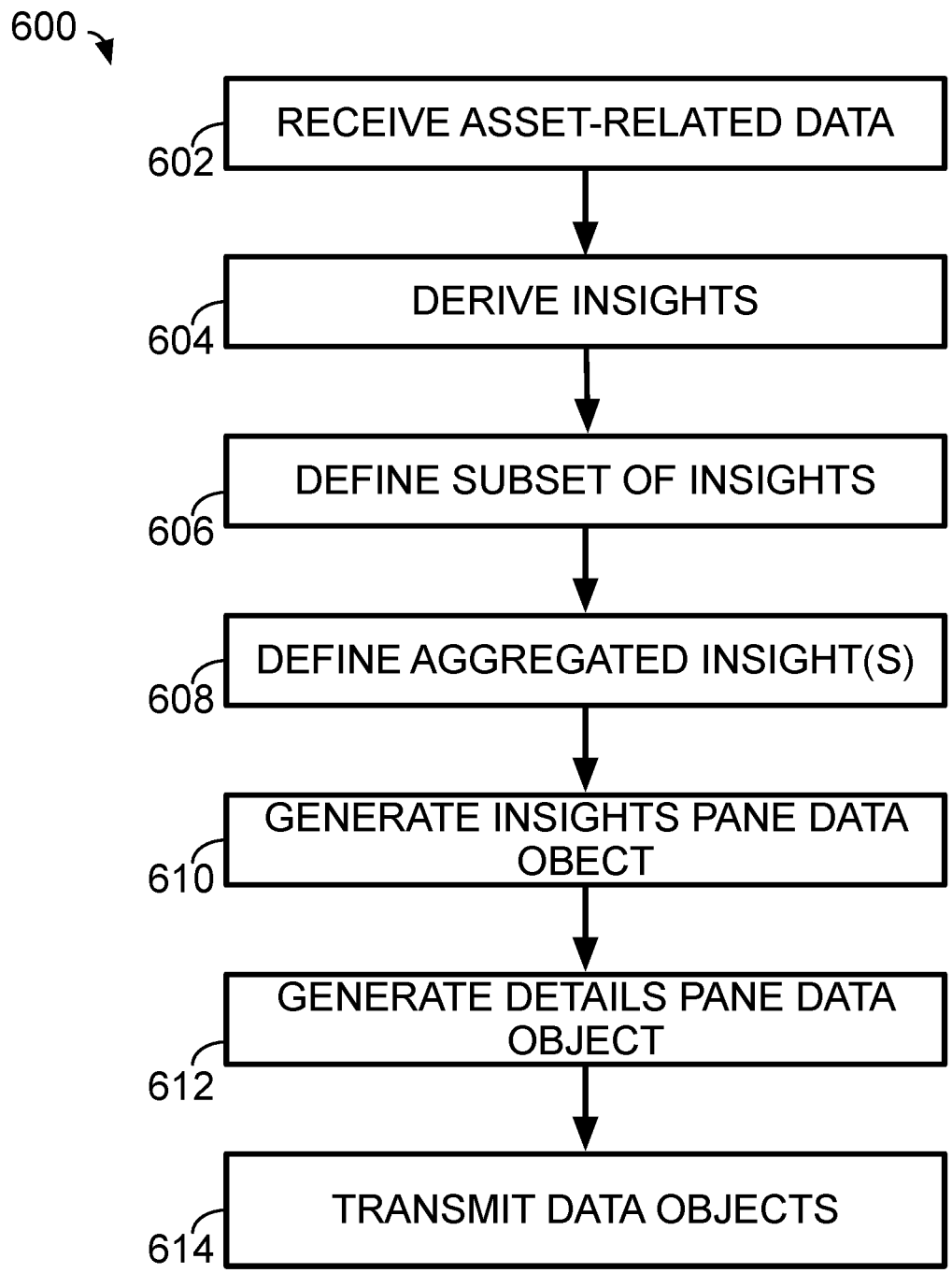
FIG. 6A depicts a flow diagram for an example asset-insights presentation process.

With reference now to flow diagram 600 of FIG. 6A, asset data platform 102 may be configured to implement an example asset-insights presentation process that generally involves (i) at block 602, receiving asset-related data, (ii) at block 604, based on the asset-related data, deriving asset insights corresponding to at least one asset (e.g., asset 104A), (iii) at block 606, defining a particular subset of insights to be presented to a given user, (iv) at block 608, defining one or more aggregated insights, each being representative of two or more of the insights from the subset that appear to be related to one another such that they should be presented together, (v) at block 610, generating a data object for an insights pane, (vi) at block 612, generating a data object for a details pane, and (vii) at block 614, transmitting the data objects to a client station associated with the given user, such as client station 106A, and thereby presenting an insights GUI view to the given user via client station 106A. Each of these functions will now be discussed in further detail.

At block 602, asset data platform 102 may receive asset-related data, such as operating data from one or more assets 104A (e.g., sensor data and/or abnormal-conditions data), asset maintenance data from maintenance data source 104C, and/or environmental data from environmental data source 104D, among other examples. Asset data platform 102 may perform this function as described above with reference to FIGS. 1-3.

At block 604, asset data platform 102 may derive one or more respective insights for at least one asset (e.g., asset 104A). In example implementations, asset data platform 102 may be configured to derive respective insights for a large number of different assets, including but not limited to one or more fleets of assets that are owned and/or operated by one or more organizations.

In general, a derived insight may comprise a detection by asset data platform 102 of a potential problem at a particular asset (e.g., asset 104A) that might be of interest to (i.e., may require action by) a user that oversees or otherwise manages the asset. For instance, a given insight may comprise a detection by asset data platform 102 of some kind of abnormality related to asset 104A's operation that is indicative of a potential problem at asset 104A. In example implementations, a derived insight may correspond to an event that has already occurred at a given asset (e.g., the given asset has exhibited an abnormal operating condition) or to an event that may occur in the foreseeable future (e.g., the given asset may have a failure in the next week), among other possibilities. In this regard, various categories of insights are possible.

One possible category is an outlier insight, which may comprise a determination by asset data platform 102 that measurement values output by one or more sensors of a given asset are abnormal or otherwise unexpected. For example, asset data platform 102 may determine that a value from a particular sensor on asset 104A is outside of a normal range for the particular sensor, where the normal range may be defined based on historical data for the particular sensor of asset 104A and/or similar sensors of one or more other assets that reflect the values of the particular sensor during normal asset operation.

Another possible category is a critical-fault insight, which may comprise a determination by asset data platform 102 that a given type of fault deemed to be "critical" has occurred at a given asset (e.g., a type of fault that may result in inoperability of the given asset). For instance, asset data platform 102 may determine, based on operating data for asset 104A, that a particular fault code was triggered at asset 104A that is representative of a given type of fault considered to be "critical," such as an engine failure.

In this respect, in some cases, operating data indicative of a fault (e.g., abnormal-conditions data) may include an indication (perhaps in metadata or the like) that the fault is considered to be "critical," and asset data platform 102 may receive and process the operating data along with the included indication to determine that the fault is considered to be "critical." In other cases, asset data platform 102 may process the operating data to determine the nature of the fault and then make a determination that this fault is considered to be "critical," perhaps using a look-up table or the like. Platform 102 may determine that a "critical" fault has occurred in other manners as well.

Yet another possible category is a failure-prediction insight, which may comprise a prediction by asset data platform 102 that a given type of failure is likely to occur at a given asset in the foreseeable future. In this respect, asset data platform 102 may render such a prediction using (i.e., by executing) a failure prediction model that is configured to receive data related to the operation of asset 104A as the model's inputs (e.g., sensor data from a certain set of sensors of asset 104A) and then output an indication of whether a failure of the given type is predicted to occur at asset 104A within some period of time in future (e.g., within the next two weeks). Additional details regarding executing failure prediction models can be found at previously referenced U.S. application Ser. No. 14/732,258.

Still another possible category is an anomaly insight, which may comprise a prediction by asset data platform 102 that multivariate sensor data being output by a given asset (e.g., measurement values output by a particular set of sensors at the given asset) is indicative of a potential problem at the given asset. In this respect, asset data platform 102 may render such a prediction using (i.e., by executing) an anomaly detection model that is configured to receive asset 104A's multivariate sensor data and output an indication of whether an anomaly has been detected at asset 104A. Additional details regarding executing anomaly detection models can be found at previously referenced U.S. application Ser. Nos. 15/367,012 and 15/788,622.

Other possible categories of derived insights are also possible, including but not limited to predictions of other types of event occurrences at an asset.

Thus, as demonstrated above, asset data platform 102 may derive an insight based on asset-related data in a variety of manners. For example, platform 102 may derive an insight (e.g., an outlier insight) based on comparing one or more values from asset-related data to one or more threshold values that may be defined based on historical asset-related data. As another example, platform 102 may derive an insight (e.g., a critical-fault insight) based on identifying an occurrence of an asset fault that has been deemed to be a critical fault utilizing asset-related data. As yet another example, platform 102 may derive an insight (e.g., a failure-prediction insight or an anomaly insight) based on executing one or more predictive models utilizing asset-related data, such as operating data in the form of sensor and/or abnormal-conditions data. Other example manners of deriving insights are also possible.

In any case, after asset data platform 102 derives an insight, platform 102 may then store data defining the particular derived insight. In this regard, various data may be stored for each derived insight. In example embodiments, platform 102 may store, for each derived insight, one or more of (i) an asset descriptor, (ii) an insight descriptor, (iii) an insight timestamp, (iv) an insight status, (v) an insight severity level, and (vi) a derivation identifier, among other data.

An asset descriptor generally provides a description of the particular asset that corresponds to the given insight. As one example, an asset descriptor (e.g., "Bulldozer X1024") may include (i) an asset identifier that may uniquely identify the particular asset from other assets (e.g., "X1024") and (ii) an asset type identifier that identifies a type or class of the particular asset, (e.g., "Bulldozer"), among other asset information. Other example asset descriptors are also possible.

An insight descriptor generally provides an explanation of the particular derived insight, such as a name assigned to (or other indication of) the category of the insight (e.g., an identifier corresponding to a failure-prediction insight), a name assigned to the insight (e.g., "engine failure," "exhaust-system critical fault," etc.), and/or a textual description of the insight, among other information. In practice, additional information included in a given insight descriptor may depend on the category of the particular derived insight. For example, (i) for an outlier insight, the insight descriptor may include an identifier (or the like) for the sensor exhibiting the outlier condition, (ii) for a critical-fault insight, the insight descriptor may include an event code (e.g., a fault code) or the like corresponding to the particular fault, (iii) for a failure-prediction insight, the insight descriptor may include an identifier (or the like) of the particular failure type being predicted, and (iv) for an anomaly insight, the insight descriptor may include an identifier (or the like) of which set of sensors are indicative of the anomaly. Other examples are also possible. Moreover, in some cases, asset data platform 102 may store as part of the insight descriptor various other information (e.g., OEM asset operation recommendations) related to the given insight, which platform 102 may obtain from various sources, such as asset manufacturers, asset instruction manual, etc. Other example insight descriptors are also possible.

An insight timestamp generally provides a temporal indication of a time associated with the particular insight. In practice, the insight timestamp may correspond to a point in time that already occurred or may correspond to a point in time in the future, which may be depend on the category of the particular insight. For example, the insight timestamp may provide a temporal indication of when the asset-related data was produced that led to the derived insight (e.g., when a fault code for a "critical fault" was triggered or when a sensor generated "outlier" data at asset 104A). As another example, the insight timestamp may provide a temporal indication of when a particular failure is predicted to occur in the future. In example embodiments, an insight timestamp may include a date and/or a time. In some cases, as discussed later, a range of dates and/or times may be stored. Other example insight timestamps exist as well.

An insight status generally provides an indication of the state of the particular insight, such as "new," "open," "in-progress," or "closed." In example implementations, when an insight is first derived, its corresponding insight status is set to "new." Insight statuses are discussed in further detail below.

An insight severity level generally provides an indication of the importance of the given insight (i.e., how quickly a user overseeing the assets should take action on the given insight). In example implementations, an insight severity level provides an indication of how severely an asset's operation is expected to be impacted if no action is taken with respect to the given insight. In this regard, there are various possible severity-level scales.

As one example, an insight may be categorized as (i) "severe" (or "urgent") when it is associated with an event that can have a significant impact on an asset's operation (e.g., a failure type that is expected to render an asset inoperable), (ii) "medium" (or "moderately urgent") when it is associated with an event that can have a moderate impact on an asset's operation (e.g., a failure type that is expected to limit an asset's operation but not render it inoperable), or (iii) "low" when it is associated with an event that typically has minimal impact on an asset's operation, among other possible severity-level categorizations. In this respect, asset data platform 102 may be configured to assign a severity level to each derived insight in a variety of manners, such as by accessing a look-up table (or the like) or by utilizing some other logic that maps derived insights to severity levels. Further, the manner in which a given insight's severity level is represented may take various forms, examples of which include a set of textual indicators (e.g., "Critical," "Medium," "Low," etc.), a scale of numerical indicators, or the like.

A derivation identifier generally provides an indication of the logic module or modules that were used by asset data platform 102 to derive the given insight. As one example, a derivation identifier may take the form of a model identifier identifying a predictive model that was used to derive the given insight. In some implementations, platform 102 may only store a derivation identifier for certain categories of derived insights, such as failure-prediction and anomaly insights. Other example derivation insights are also possible.

Other types of data may be stored for derived insights, some examples of which are discussed later. Moreover, as discussed below, the data defining a given insight may be updated over time.

In any case, as discussed in detail below, asset data platform 102 may subsequently access the stored insights data to facilitate presenting insight-related visualizations to users. In this regard, platform 102 may be configured to provide a user with a new GUI view for visualizing and interacting with insights of interest, which is intended to help a user to quickly understand the nature of derived insights and to efficiently access relevant information and functions of interest related to the insights. To these ends, the new GUI view (i.e., "insights view") may take various forms.

In one example embodiment, an insights view may include multiple panes, each providing a different level of detail regarding derived insights. FIG. 7A provides an illustrative example of a simplified insights view 700 that may be rendered at client station 106A. As shown, insights view 700 includes an example insights pane 710 and an example details pane 720. Insights pane 710 comprises a list arrangement of GUI elements corresponding to a particular subset of derived insights (i.e., "insight entries"). As shown, several of these insight entries 730*a-g* are fully visible, while an additional insight entry is partially visible. Additional insight entries may be accessed by scrolling down the list. Each insight entry 730*a-g* provides a high-level overview of a respective insight. Details pane 720 includes several GUI panels 740, 750, 760, and 770, each providing certain additional details regarding an insight represented by a select insight entry (e.g., insight entry 730*b*). Aspects of insights pane 710 and details pane 720 will be discussed in further detail below.

Returning to FIG. 6A, at block 606, asset data platform 102 may define a particular subset of insights to be presented to a given user from the insights derived at block 604. In practice, platform 102 performs this function in response to receiving from client station 106A a request for access to asset insights that have been derived by the platform 102, where the request includes access credentials (e.g., a username and password) or the like that are used to verify the identity of the given platform user, who may have previously registered with platform 102 through an onboarding process (or the like). However, asset data platform 102 may perform this function in response to other triggers as well. For example, in some implementations, platform 102 may be configured to "push" insights to certain client stations, which it may do after it derives one or some other threshold number of insights, among other possible push triggers.

In any case, asset data platform 102 may define the particular subset of insights in a variety of manners. For example, platform 102 may define the particular subset of insights based on user preferences information associated with the given user.

In particular, asset data platform 102 may first determine an identity of the given platform user (e.g., based on the credentials from the access request), and based on the determined user's identity, platform 102 may access user preferences information associated with the given user. In practice, platform 102 may have previously received this user preferences information associated with the given user in various manners, such as during an onboarding process (or the like).

The user preferences information that is accessed and used by asset data platform 102 to define the particular subset of insights to be presented to the given user may take various forms, examples of which may include an indication of which assets are most important to the given user (i.e., "high-priority" assets), an indication of which categories of insights are most important to the given user (e.g., outlier insights), an indication of which insight severity levels are most important to the given user (e.g., "Critical" insights), an indication of insight states that are most important to the given user (e.g., "new," "open," "in progress," "closed," etc. insights), an indication of an insight occurrence state that is most important to the given user (e.g., insights corresponding to events that have already occurred or to predictions of events that will occur in the future), and/or an indication of an insight confidence level corresponding to the platform 102's confidence in deriving a given insight, among other possibilities. In practice, user preferences information may be specific to a given platform user, or they may be specific to a particular organization, in which case the user preferences information may apply to multiple platform users. In some cases, platform 102 may access "default" user preferences information, such as when a given user/organization has not established any particular user preferences.

Based on the accessed user preferences information and the universe of available insights that have been derived (e.g., at block 604), asset data platform 102 may define the particular subset of insights for presentation to the given user (i.e., a "curated set of insights"). In this regard, while there may be a larger set of available insights that could potentially be of some interest to the given user (e.g., insights related to all assets for which the given user has responsibility, regardless of the category or status of the insights), platform 102 may apply the user preferences to filter this larger set of insights down to a smaller subset of insights that are of most interest to the given user (e.g., a subset that include insights for particular assets only, particular types of insights only, insights having a particular status, etc.).

Further, asset data platform 102 may also use the user preferences information to determine a priority of the particular subset of insights that is defined for the given user, and this priority may then be used as a basis for determining how the corresponding insight entries are organized when presented at client station 106A. For example, returning to FIG. 7A, the insight entries may be organized based on priority with the insight corresponding to insight entry 730*a* being of higher priority than the insight corresponding to insight entry 730*b*, which is in turn of higher priority than the insight corresponding to insight entry 730*c*, and so forth. However, an insights view that is ultimately presented at client station 106A may allow a user to organize the presented insight entries in other manners as well (e.g., by selecting from a drop-down menu an option to sort by date/recency).

In some embodiments, in addition to or instead of user preferences information, asset data platform 102 may also be configured to use other types of information to define the particular subset of insights to be presented to the given user. As one possibility, platform 102 may use asset environmental data (e.g., geospatial, seasonality, and/or weather data) as a basis for defining the particular subset of insights, among other data. For instance, when defining the subset of insights, platform 102 may access environmental data (e.g., previously received from environmental data source 104D) for the location(s) of the assets associated with the given user and may then use this environmental data as an additional basis for filtering and/or otherwise selecting the particular insights that are included in the subset.

For example, asset data platform 102 may disregard (i.e., not include in the subset) or de-prioritize insights that are based on high temperature readings at an asset if the ambient temperature at the asset's location is high, whereas platform 102 may include in the subset (and perhaps also prioritize) insights that are based on high temperature readings at an asset if the temperature at the asset's location is low. As another example, platform 102 may disregard or de-prioritize insights that are based on high RPM readings at an asset if the terrain at the asset's location includes steep inclines, whereas platform 102 may include in the subset (and perhaps also prioritize) insights that are based on high RPM readings at an asset if the terrain at the asset's location is relatively flat. As yet another example, platform 102 may disregard or de-prioritize insights that are based on data corresponding to instances in time when an asset is located at a particular location of interest (e.g., an organization's maintenance facility). Other examples are also possible.

Additionally or alternatively, asset data platform 102 may be configured to use other types of information to define the particular subset of insights to be presented to the given user, such as information regarding asset operating parameters, conditions at a worksite (or the like) where assets operate, government regulations applicable to the assets, and/or asset parts inventory (or the like), among other possibilities.

Further yet, in some implementations, asset data platform 102 may not select a subset of insights that are of most interest to the given user, but may instead select all derived insights that that could potentially be of some interest to the given user (e.g., insights related to all assets for which the given user has responsibility, regardless of the category or status of the insights). In other words, in some implementations, block 606 may be optional.

At block 608, based on the defined subset of insights, asset data platform 102 may define at least one aggregated insight to the extent that two or more of the derived insights in the subset appear to be related to one another such that they should be represented together. In other words, platform 102 may employ logic to determine whether any of the individual insights in the subset share a relationship, such that they should be grouped into an "aggregated insight." Platform 102 may be configured to define aggregated insights in a variety of ways.

As one possibility, asset data platform 102 may be configured with logic that includes a variety of rules dictating when insights are deemed to share a relationship and when aggregation should apply. As one example, platform 102 may be configured with logic that enables it to determine whether insights appear to be related to a common underlying problem at a given asset, which it may determine in a variety of manners. For instance, platform 102 may make such a determination based on the underlying details of the insight (e.g., platform 102 may aggregate critical-fault insights corresponding to different occurrences of the same fault code being triggered at asset 104A into a single aggregated insight) and/or the physical component (or system) of an asset that the insights relate to (e.g., platform 102 may aggregate some or all categories of insights that correspond to an asset's engine), among other possibilities.

As another example, asset data platform 102 may be configured with logic that enables it to determine whether insights appear to be related to a common physical component (or system) of a given asset (regardless of whether the insights appear to be related to a common underlying problem). For instance, platform 102 may aggregate insights relating to asset 104A's exhaust system into a first aggregated insight and aggregate insights relating to asset 104A's brake system into a second aggregated insight.

In another example, asset data platform 102 may be configured with logic that causes it to group insights based on the location of a given asset when asset-related data for the insights were generated. For instance, platform 102 may aggregate insights that are derived based on asset-related data from asset 104A that was generated while asset 104A was located at one or more predefined locations (and/or within one or more predefined regions).

As yet another example, asset data platform 102 may be configured with logic that causes it to group related insights only if these related insights have a temporal relationship as well. For instance, the logic may dictate that insights may be grouped together if (i) they appear to be related to one another (e.g., in accordance with one or more of the above-mentioned examples) and (ii) they each have a respective associated time that falls within a threshold amount of time of one another.

In this respect, as discussed before, each insight may have an associated time that, depending on the nature of the given insight, may correspond to a point in time that already occurred or may correspond to a point in time in the future. Asset data platform 102 may be configured to evaluate these insight timestamps to facilitate aggregation.

Figure 8A:
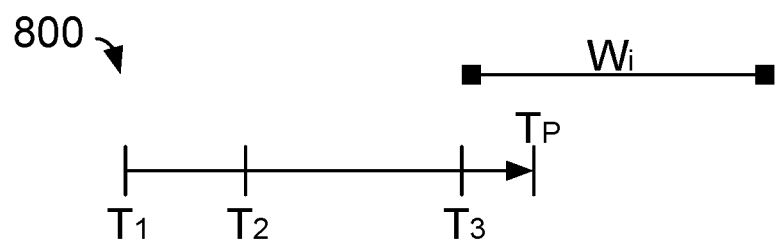
FIG. 8A depicts a conceptual illustration of a timeline for an example aggregated insight at a first point in time.

As one example to illustrate, asset data platform 102 may be configured with logic dictating that if an engine failure has been predicted for a given asset, then other insights (i) that are related to the given asset's engine (e.g., outlier and/or anomaly insights derived based on sensor data associated with the given asset's engine, critical faults related to the given asset's engine, etc.) and (ii) that have an associated time (e.g., a time when the sensor data underlying the outlier and/or anomaly insight was generated at the given asset) that falls within a certain amount of time of one another should be grouped together with the engine failure prediction into a single aggregated insight. FIG. 8A provides an example conceptual illustration of a timeline 800 for an engine-failure aggregated insight that comprises three insights that have associated insight times $T_1$, $T_2$, and $T_3$ with time $T_3$ being closest to the present time $T_p$.

Figure 8B:
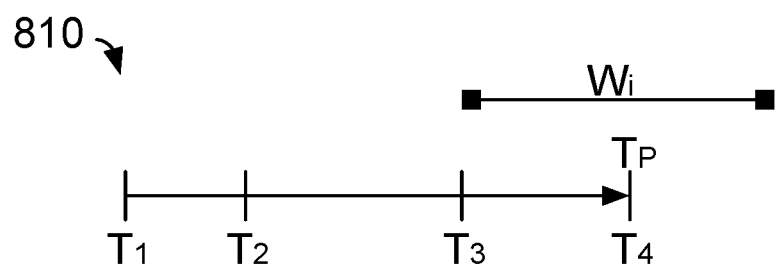
FIG. 8B depicts a conceptual illustration of a timeline for an example aggregated insight at a second point in time.

Additional engine-failure related insights may continue to be grouped into this aggregated insight if such insights have a time that falls within a given window of time after the insight in the group having the most-recent insight time. In FIG. 8A, window of time $W_i$ (i.e., "window of inactivity") extends from time $T_3$, which corresponds to the most-recent insight time for the engine-failure aggregated insight. As shown in timeline 810 of FIG. 8B, the present time $T_p$ has progressed and asset data platform 102 derived a fourth insight related to engine failures and that fourth insight has an associated insight time at time $T_4$. Since time $T_4$ is within window of time $W_i$, the fourth insight is grouped into the engine-failure aggregated insight. Window of time $W_i$ then shifts to and extends from time $T_4$.

Figure 8C:
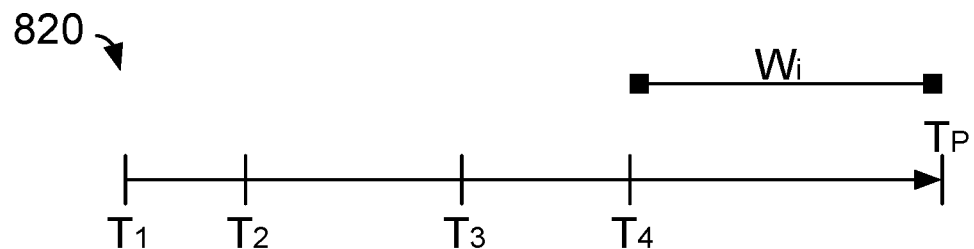
FIG. 8C depicts a conceptual illustration of a timeline for an example aggregated insight at a third point in time.

On the other hand, if the given window of time after the most-recent insight time for the group elapses without any new, related insights being derived having an insight time within window of time $W_i$ that aggregated insight closes. Any additional engine-failure related insights for the given asset are thereafter grouped into a new, separate aggregated insight. For example, as shown in timeline 820 of FIG. 8C, the present time $T_p$ progressed to the end of window of time $W_i$ without asset data platform 102 deriving a new, engine-failure related insight having an insight time within window of time $W_i$. Consequently, platform 102 closes the engine-failure aggregated insight comprising the four insights. Many other examples are possible as well.

Based on the foregoing, a person of ordinary skill in the art will appreciate that there may be instances in which an individual insight may satisfy aggregation logic such that the individual insight should be included in an aggregated insight, but at that time, the individual insight may be the only insight currently included in the particular aggregated insight (e.g., the particular aggregated insight may not yet be closed). Asset data platform 102 may present an insight entry representing the particular aggregated insight as either a single insight or as an aggregated insight comprising one individual insight. Other examples are also possible.

In any event, when asset data platform 102 defines a given aggregated insight, it may store data related to the aggregated insight much like the insight data stored for an individual insight discussed above, except that the stored data reflects the aggregate nature of the insight. Moreover, platform 102 may store additional types of data that may not be stored for individual insights.

For example, asset data platform 102 may maintain an aggregation count for the given aggregated insight representing how many individual insights the aggregated insight represents. This data variable may be updated (e.g., incremented) until platform 102 closes the insight.

As another example, platform 102 may store an aggregation timestamp that generally provides a temporal indication of the timespan for which the aggregated insight applies. This timespan may be defined based on the insight timestamp for the oldest insight in the group and the insight timestamp for the youngest insight in the group. In example embodiments, an aggregation timestamp may include (i) a date timespan (e.g., a date range) when the aggregated insight includes individual insights that have insight times on different days or (ii) a date and a range of times when the aggregated insight includes individual insights that have insight times on the same day. Other examples of aggregation timespans are also possible.

Furthermore, asset data platform 102 may store pointers or the like to the insight data of the individual insights of the aggregated insight. In this way, platform 102 can readily fetch data of interest for a given insight within the group. Platform 102 may store other additional data for aggregated insights as well.

Returning to FIG. 6A, at block 610, asset data platform 102 may generate a data object that defines the visual appearance of a particular insights pane and is renderable by a client station (or the like) to display the particular insights pane to a user. In this regard, the insights-pane data object generally includes associated data and/or instructions that define the visual appearance of a particular insights pane for a front-end application or the like.

In practice, asset data platform 102 may generate the insights-pane data object in a variety of manners. As one possibility, the insights-pane data object may be generated based on (i) the data defining the insights of the particular subset of insights (defined at block 606) and (ii) logic for the insights pane. In example implementations, the logic for the insights pane may cause platform 102 to access one or more predefined presentation templates and populate fields thereof based on at least parts of the insights data for the insights included in the subset. For example, platform 102 may (i) access a presentation template that defines data fields and other elements that are part of an insight entry, (ii) add an instance of the template to the insights-pane data object for each insight in the subset, and (iii) for each insight in the subset, use data defining the given insight to populate fields of a given template instance that will be representative of the given insight. Platform 102 may generate the insights-pane data object in other manners as well.

At block 612, asset data platform 102 may also generate a data object that defines the visual appearance of a particular details pane and is renderable by a client station (or the like) to display the particular details pane to a user. In this respect, the details-pane data object generally includes associated data and/or instructions that define the visual appearance of a details pane for a front-end application or the like.

In practice, asset data platform 102 may generate the details-pane data object in a variety of manners. As one possibility, platform 102 may first select, from the particular subset of insights, a first insight for which the particular details pane will provide additional information. Platform 102 may select this first insight in a variety of manners. In some implementations, this insight may be selected based on how the subset of insights is organized. For example, if the particular subset of insights to be presented to the given user is arranged as a list, the selected insight may be the first insight in the list. Notably, in some implementations, the first instance of the insights view that platform 102 presents to client station 106A may include a "blank" details pane, in which case the details-pane data object may be empty or otherwise indicate that no insight details are to be displayed.

In any event, based on (i) data defining the first selected insight, (ii) logic for the details pane, and (iii) perhaps other data associated with the first selected insight, asset data platform 102 may generate the details-pane data object that defines the visual appearance of a particular details pane that provides additional details regarding the first selected insight. In example embodiments, the logic for the details pane may cause platform 102 to dynamically assemble a presentation template for the particular details pane by (i) identifying the category of the first selected insight and (ii) based on the identified category, accessing one or more panel templates. In this respect, the panels that are included in a presentation template may differ depending on the nature of the first selected insight (e.g., the category of the first selected insight).

In example embodiments, regardless of the nature of the selected insight, the presentation template for the details pane may include (i) a summary panel that provides high-level details for the selected insight, (ii) an asset-status panel that provides additional details regarding the status of the given asset that is the subject of the insight, and (iii) a recent-events panel that provides details regarding recent events that occurred at the given asset. The remaining panels of the presentation template (if any) may then vary depending on the category of the selected insight. For example, if the selected insight is an outlier insight, a channel-plot panel may be included that comprises a time-series graph of the recent values of the sensor that is the subject of the outlier-type insight, perhaps along with an indication of the normal range of values for the sensor. As another example, if the selected insight is a critical-fault insight, a fault-occurrence timeline panel may be included that comprises a timeline of occurrences of the fault type that is the subject of the critical fault-type insight. As yet another example, if the selected insight is a failure-prediction or anomaly insight, one or more panels may be included for presenting contextual information that is specifically relevant to the particular type of failure or anomaly that has been predicted by asset data platform 102 (in which case the presentation templates may vary at both an insight-category-level and also at a more granular level). These one or more panels may include one or more channel-plot and/or fault-occurrence timeline panels, among other possibilities. A presentation template for the details pane may include other types of panels as well.

After asset data platform 102 has added the applicable panel templates to the details-pane presentation template, platform 102 may populate respective fields of the panel templates using data defining the first selected insight as well as other data related to the insights, such as operating data (e.g., sensor data and/or abnormal-conditions data related to the insight), maintenance data, and/or environmental data (e.g., last known geospatial data for asset 104A), among other examples.

In some cases, the logic for the details pane may also determine which particular data variables (e.g., particular data fields, plot channels, etc.) are to be populated into a particular panel template based on data associated with the first selected insight, such as data identifying the particular type of failure or anomaly that is the subject of the first selected insight and/or data identifying the logic module(s) that were used to derive the first selected insight. In practice, this data may be included in (or derived) from the insight-descriptor and/or derivation-identifier data of the first selected insight. As one illustrative example, for a failure-prediction insight, the details-pane logic may cause asset data platform 102 to (i) identify a model identifier corresponding to the given insight, (ii) based on the model identifier, identify one or more input variables of the corresponding predictive model (e.g., values from sensors A, B, and C of asset 104A), (iii) determine that a channel-plot panels is to be populated with a particular segment of time-series data for each of the one or more input variable, and (v) populate a channel-plot panel template with the applicable data. Other examples are also possible.

Notably, in some cases, asset data platform 102 may utilize data associated with the first selected insight, such as data identifying the particular type of failure or anomaly that is the subject of the first selected insight and/or data identifying the logic module(s) that were used to derive the first selected insight, to identify one or more panel templates to include in the particular details-pane presentation template in the first instance. For example, if the first selected insight was derived using a particular anomaly model, the logic for the details pane may determine that a given type of panel is applicable to that particular anomaly model, which may cause platform 102 to add a panel template corresponding to that given type of panel to the details-pane presentation template, which may be then populated in line with the above discussion. Other examples are also possible.

In a scenario where the first selected insight is representative of a group of insights (i.e., is an aggregated insight) rather than an individual insight, asset data platform 102's logic may be configured to elect one of the constituent insights (e.g., the highest priority insight within the group), and the presentation template may then be based on that constituent insight.

At block 614, asset data platform 102 may transmit the data objects to client station 106A, thereby presenting an insights GUI view. Client station 106A in turn renders the insight view comprising the particular insights and details panes using the data objects.

As suggested before, insight entries for the particular subset of insights may be presented within the insights pane in a variety of arrangements, such as a list, chart, diagram, or some other visual arrangement. Likewise, each individual insight entry within the particular arrangement may take a variety of forms, such as a rectangular or other shaped "tile" (or "card"), and may include a variety of GUI elements. Further yet, the details pane may include a variety of different GUI panels, which may depend on the category of a respective insight from the insights pane. Each panel can be presented in a variety of manners and may include a variety of different GUI elements. In general, each panel includes relevant details for a particular insight along with other contextual information and/or functions of interest related to the particular insight that a user may find valuable when deciding whether or not to take action on the insight. Example insights view 700 of FIG. 7A that comprises example insights pane 710 and example details pane 720 is discussed later.

Figure 6B:
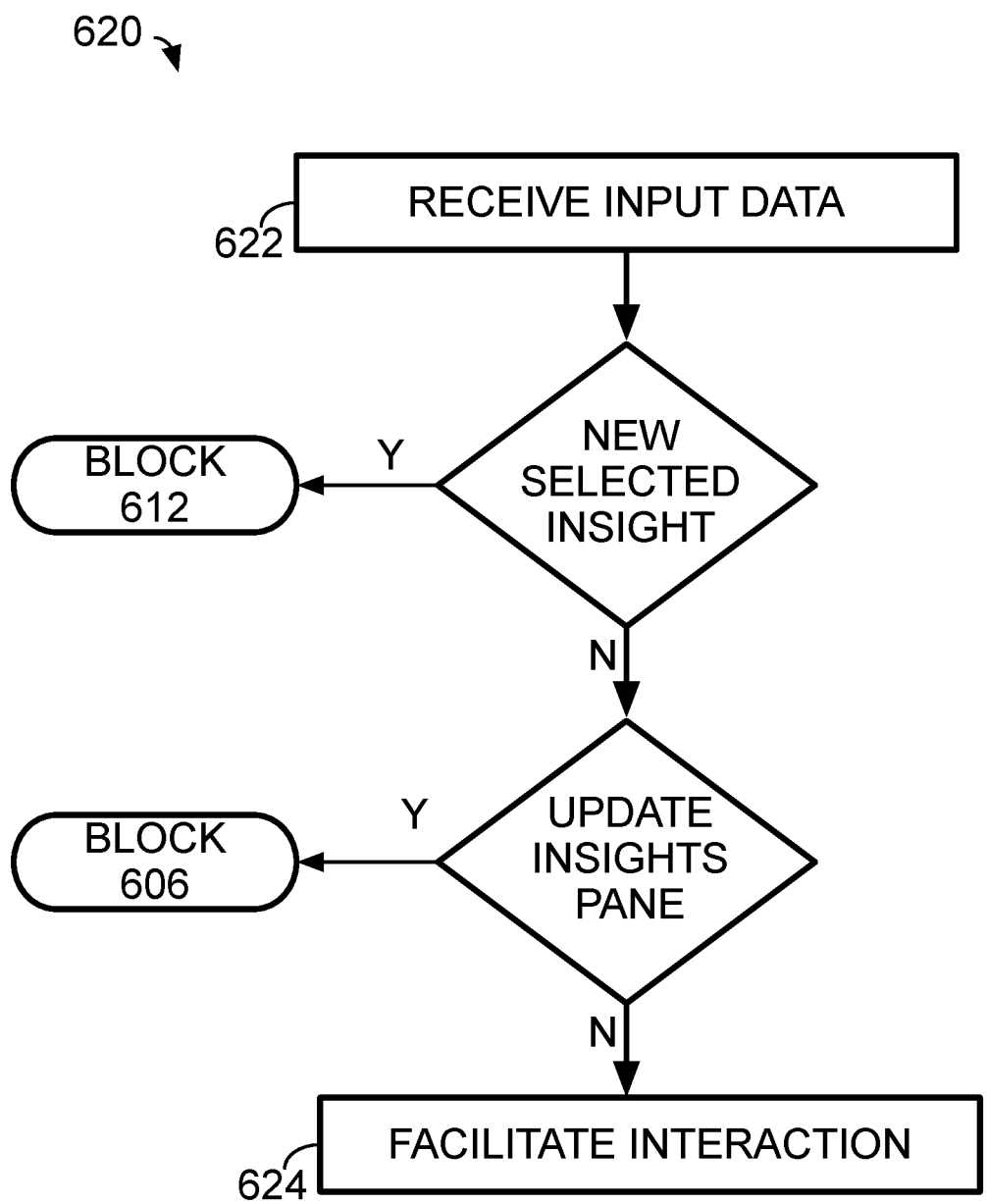
FIG. 6B depicts a flow diagram for an example user-interaction handling process.

After asset data platform 102 presents a first instance of the insights GUI view to the given user via client station 106A, the user may interact with the GUI by providing an input (e.g., mouse-based input, touch-based input, or the like) at client station 106A. Flow diagram 620 of FIG. 6B provides an example process implemented by platform 102 to facilitate handling user interactions at the insights view.

At block 622, asset data platform 102 receives from client station 106A input data indicative of a user interaction at the insights GUI view presented at client station 106A. Platform 102 may process the input data to determine whether the data is indicative of a selection of a particular insight entry from the insights pane and if so, whether the selected entry differs from the entry for the first selected insight. If platform 102 identifies the insight underlying the selected insight entry as being different from the first selected insight, platform 102 may return to block 612 of process 600 and carry out the applicable functions.

In this regard, based on (i) data defining this newly-selected insight, (ii) the logic for the details pane, and (iii) perhaps other data associated with this newly-selected insight, asset data platform 102 may generate a new data object that defines the visual appearance of an updated details pane that provides additional details regarding the newly-selected insight and enables client station 106A to render the updated details pane. Platform 102 may then transmit at least this new data object to client station 106A, which in turn renders the updated insight view comprising the updated details pane using the new data object. This general process repeats each time the given user selects a new insight entry from the insights pane.

As discussed before, FIG. 7A illustrates an example of a simplified insights view 700 that may be rendered at client station 106A based on data objects from asset data platform 102. In particular, insights view 700 may be rendered by client station 106A in response to a user selection of insight entry 730b (whose selection is indicated by the bolded border) after platform 102 presented one or more prior instances of the insights GUI view. As shown, insights view 700 includes example insights pane 710 comprising a list arrangement of insight entries (of which insight entries 730a-g are visible) and a details pane 720 comprising example GUI panels 740, 750, 760, and 770. FIGS. 7B, 7C, 7D, 7E, and 7F provide illustrative examples of certain aspects of insights pane 710 and details pane 720. However, it should be understood that FIGS. 7A-7F are provided for sake of explanation and illustration only and thus should not be construed as limiting.

Figure 7B:
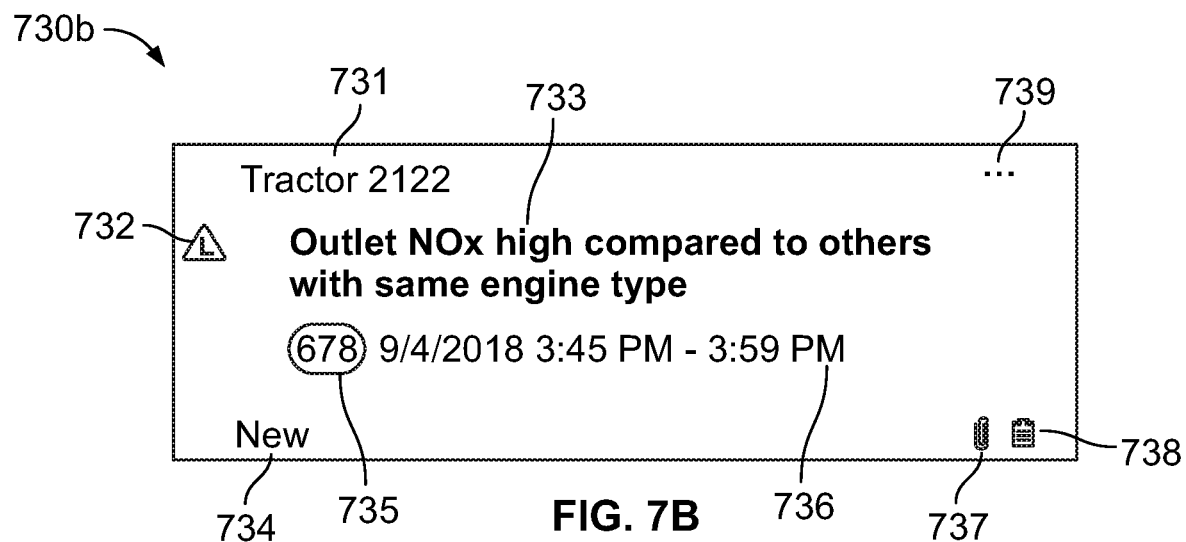
FIG. 7B depicts a simplified version of an example insights entry rendered at a client station.

Turning to FIG. 7B, a more detailed version of insight entry 730b is depicted. As shown, insight entry 730b includes an asset indicator 731 that provides an indication of the type (e.g., "Tractor") and identity (e.g., "2122") of the particular asset that corresponds to the given insight represented by insight entry 730b. In some cases, an asset indicator may take a form other than text, such as a graphical icon or the like, that provides an indication of the particular asset at issue. In practice, an asset indicator may be derived based on asset-descriptor data stored by asset data platform 102 for the given insight.

Insight entry 730b also includes a severity level indicator 732 that takes the form of a graphical icon indicative of a severity level that has been assigned to the insight represented by insight entry 730b. In this example, the triangle icon helps a user to easily identify this insight entry 730b as corresponding to an insight of relatively greater importance than others, such as the insights corresponding to insight entries 730e, 730f, and 730g (FIG. 7A) whose severity level indicators are circle icons indicative of relatively less important insights. Other example icons and corresponding severity levels are also possible.

In practice, severity level indicators may also be color coded to further aid in helping a user to readily identify particularly important insights. For example, severity level indicator 732 may comprise a red-colored fill indicating that the corresponding insight is of the highest severity level, whereas the severity level indicator for insight entry 730d may comprise a yellow-colored fill indicating that the corresponding insight is of a mid-range severity level. In this respect, although insight entries 730b and 730d have respective severity level indicators of the same shape (e.g., triangles) indicating relatively high importance, their fill colors help further focus a user to the more important insight of the two. Other example colors and corresponding severity levels are certainly possible.

Further yet, severity level indicators may provide a user additional information. For example, a severity level indicator may include an element indicating whether the insight underlying the given insight entry corresponds to an asset event that has already occurred or is expected to occur in the future. To illustrate, severity level indictor 732 includes a "clock-hands" symbol indicating that an asset event is likely to occur in the future, whereas the severity level indicator for insight entry 730*a* includes a "lightning bolt" symbol indicating that an asset even has already occurred. Other examples are also possible. In practice, a severity level indicator may be derived based on insight-severity-level data stored by asset data platform 102 for the given insight.

Insight entry 730*b* further includes an insight headline 733 that provides a high-level explanation of the given insight represented by insight entry 730*b*. In example implementations, an insight headline may take the form of one or more lines of text describing the given insight. In practice, an insight headline may be derived based on insight-descriptor data stored by asset data platform 102 for the given insight.

Insight entry 730*b* also includes a status indicator 734 that identifies the present status of the given insight represented by insight entry 730*b*. In this example, the status of "new" indicates that the given insight was derived recently (i.e., within a threshold amount of time ago). A status of "open" may indicate that an insight represented by a given insight entry was derived an amount of time ago that is not deemed "recent" (i.e., over the threshold amount of time ago) and no action has been taken on the given insight. A status of "in-progress" may indicate that an action has been initiated for an insight represented by a given insight entry, such as a maintenance repair or inspection being scheduled for the asset corresponding to the insight. A status of "closed" may indicate that an action has been completed for an insight represented by a given insight entry, such as the maintenance repair or inspection being completed or the given insight entry being dismissed. Other example statuses are also possible. In practice, a status indicator may be derived based on insight-status-data stored by asset data platform 102 for the given insight.

Insight entry 730*b* includes an aggregation indicator 735 indicating (i) that insight entry 730*b* corresponds to an aggregated insight and (ii) that aggregated insight comprises a particular number of occurrences of insights (e.g., 678 individual insights). In this regard, one of ordinary skill in the art will appreciate that presenting single insight entry 730*b* to represent the aggregated insight, as opposed to presenting 678 individual insight entries for the group's constituent insights, provides a more manageable but still informative GUI. In some implementations, asset data platform 102 may provide users an option to view individual insight entries for some or all of the insights that are part of an aggregated insight (e.g., a "stack" of insight "cards" that can be "expanded" and "collapsed").

In some cases, an insight entry for an individual insight may also include an aggregation indictor comprising a count indicator set to "1" (as shown in insight entry 730*d*), while in other cases, an insight entry for an individual insight may not include any aggregation indicator (as shown in insight entry 730*g*). Other example aggregation indicators are certainly possible. In practice, an aggregation indicator may be derived based on aggregation-count data stored by asset data platform 102 for the given aggregated insight.

Insight entry 730*b* further includes a timespan indicator 736 that identifies a timespan for which the individual insights of the aggregated insight represented by insight entry 730*b* have respective insight times. In this example, the individual insights have insight times from the same day (e.g., Sep. 4, 2018) during a particular window of time (e.g., between 3:45 PM and 3:59 PM). In an insight entry for an individual insight, a timespan indicator may identify a single instance in time (e.g., "9/4/2018 3:45 PM"). In practice, a timespan indicator may be derived based on timestamp data stored by asset data platform 102 for the given insight.

Insight entry 730*b* also includes insight-action status elements 737 and 738, and insight-action element 739, which is associated with one or more actions that can be taken with respect to the given insight represented by insight entry 730*b*. For example, insight-action element 739 may provide a user with access to various insight actions, which may be presented as a dropdown menu or the like.

One example action may allow a user to, via a selection input at client station 106A, cause a task for the asset that corresponds to the given insight to be generated, such as scheduling a maintenance inspection, scheduling a particular asset repair, or creating some other work order. When such a task has been created, insight entry 730*b* may include insight-action status element 737 (i.e., "task element" 737) to indicate that a task is associated with the given insight represented by insight entry 730*b*. In example implementations, selection of a create-task element provided via insight-action element 739 may cause asset data platform 102 to generate a work order and pre-populate certain fields based on the given insight represented by insight entry 730*b* and/or the asset corresponding thereto.

Another example action may allow a user to cause asset data platform 102 to create a workbook (or "notebook") associated with the given insight represented by insight entry 730*b*. In example implementations, a workbook may provide information that facilitates investigating and/or identifying the root cause of the given insight. In this respect, a workbook may be configured to compile data associated with the given insight for subsequent analysis. In any event, when a workbook has been created for the given insight, insight entry 730*b* may include insight-action status element 738 (i.e., "workbook element" 738) to indicate that a workbook is associated with the given insight.

An additional example action may allow the user to dismiss the given insight represented by insight entry 730*b* (which typically results in the insight being removed from the subset of insights) or de-prioritize the given insight represented by insight entry 730*b* (which typically results in insight entry 730*b* dropping to the bottom of the list arrangement of insights pane 710). Yet another example action may allow the user to change the status assigned to the given insight represented by insight entry 730*b*. For instance, the user may be able to mark the given insight as "closed," or change the given insight's status from "closed" to "open," among other examples. Other additional actions may also be accessible via insight-action element 739.

Figure 7C:
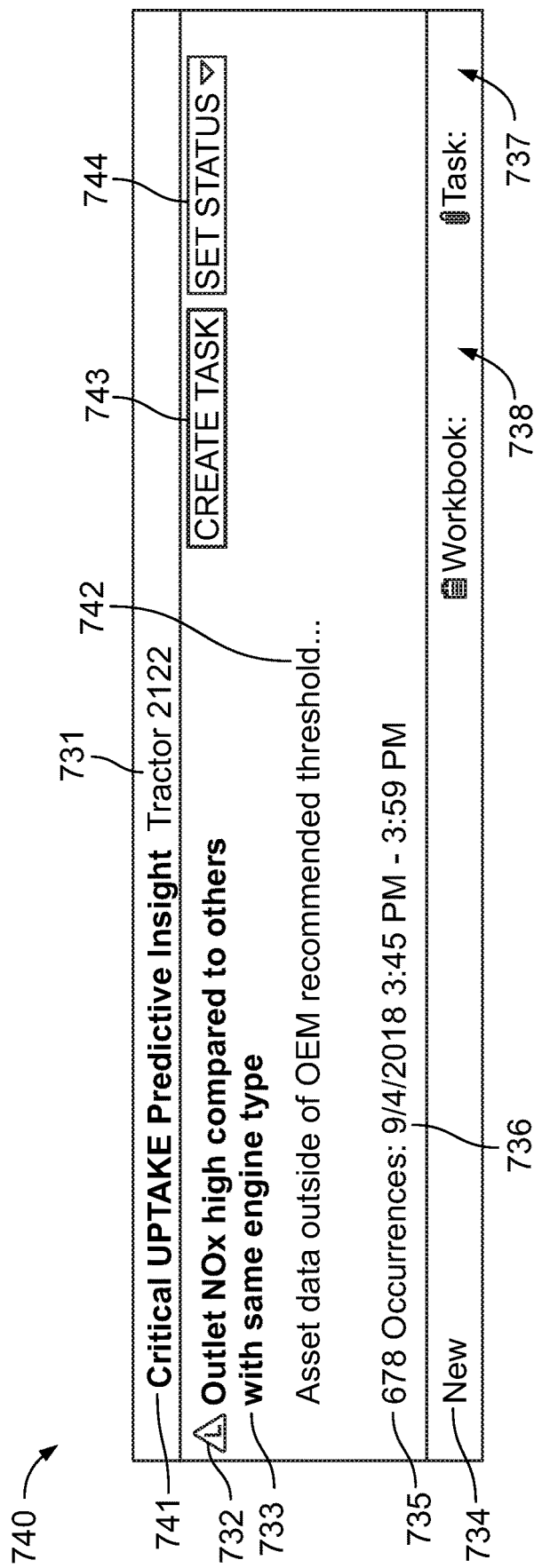
FIG. 7C depicts a simplified version of an example summary panel rendered at a client station.

Turning now to FIG. 7C, a more detailed version of details panel 740 is depicted. In this example, details panel 740 is a summary panel that provides high-level details regarding the given insight represented by the selected insight entry 730*b*. As shown, summary panel 740 includes several of the same GUI elements (some with different appearances) as insight entry 730*b*, including asset indicator 731, severity level indicator 732, insight headline 733, status indicator 734, aggregation indicator 735, timespan indicator 736, task element 737, and workbook element 738.

Summary panel 740 also includes an insight label 741 that may identify the category of the given insight (e.g., "Predictive Insight") and the severity level of the insight (e.g., "Critical"). Other examples of an insight label are also possible. In practice, an insight label may be derived based on insight-descriptor and insight-severity-level data stored by asset data platform 102 for the given insight.

Summary panel 740 further includes a detailed description 742 that provides a detailed explanation of the given insight represented by insight entry 730b. In practice, a detailed description may be derived based on insight-descriptor data stored by asset data platform 102 for the given insight. In some implementations, detailed description 742 may include one or more recommendations related to the given insight represented by insight entry 730b that platform 102 generated. For example, platform 102 may have generated one or more recommended actions for the given insight and presented in detailed description 742 respective indications of the one or more recommended actions.

Summary panel 740 also includes task element 737 and workbook element 738 that are presented when a task and workbook have been created for the given insight represented by insight entry 730b, as discussed before. In some cases, task element 737 and/or workbook element 738 may be populated with respective links (not illustrated) when a workbook or task has been created for the given insight. When selected, these links provide the user with access to information regarding the particular workbook or task that was created for the given insight. In instances when a task or workbook has not been created, summary panel 740 (and insight entry 730b) may not include task element 737 and/or workbook element 738.

Summary panel 740 includes a create-task element 743 that is configured much like the create-task element that may be provided via insight-action element 739. For instance, create-task element 743 allows a user to, via a selection input at client station 106A, cause a task for the asset that corresponds to the given insight to be generated, such as scheduling a maintenance inspection, scheduling a particular asset repair, or creating some other work order. When such a task has been created, task element 737 of summary panel 740 may be populated (as well as task element 737 of insight entry 730b) to indicate that a task is associated with the given insight. In example implementations, selection of create-task element 743 may cause asset data platform 102 to generate a work order (or other task) and pre-populate certain fields based on the given insight represented by insight entry 730b and/or the asset corresponding thereto.

Summary panel 740 includes a set-status element 744 that allows a user to, via a selection input at client station 106A, change the status assigned to the given insight represented by insight entry 730b. As with create-task element 743, user actions received via set-status element 744 may cause aspects of one or more details panels and/or insight entry 730b to be updated in accordance with the user actions.

Figure 7D:
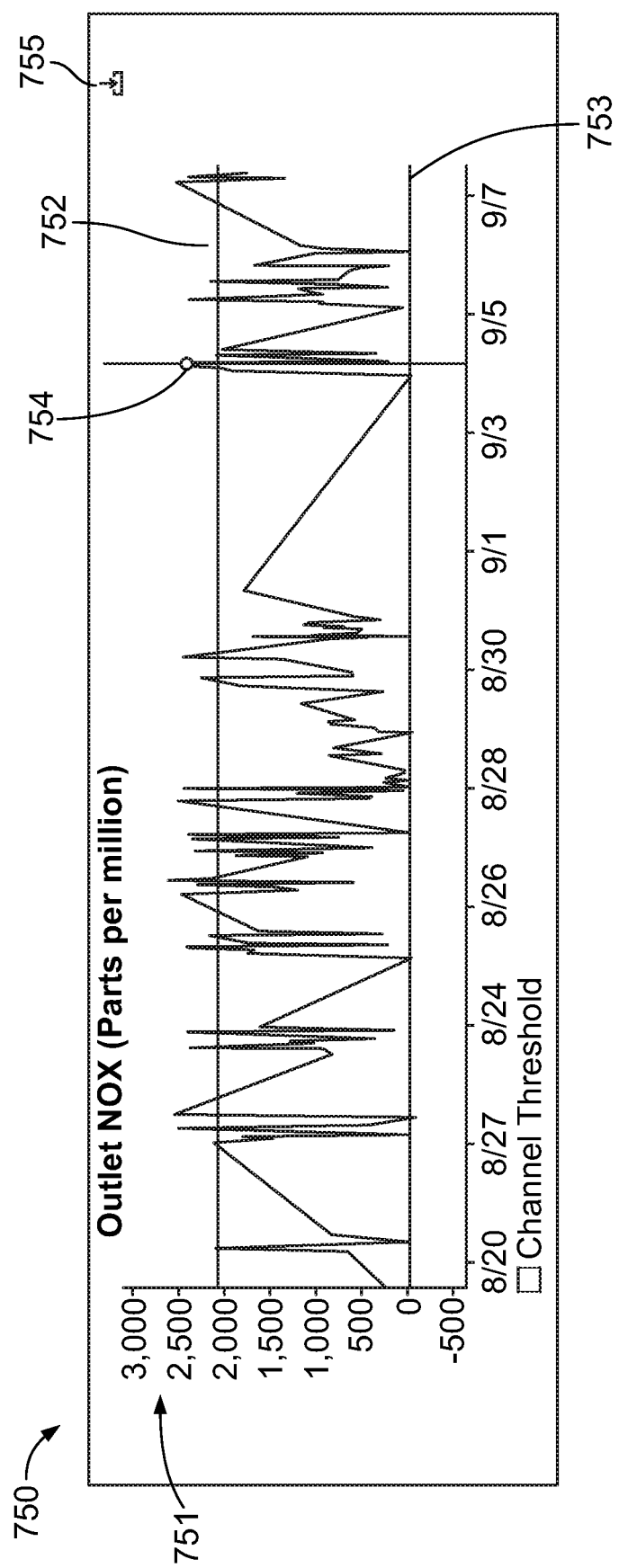
FIG. 7D depicts a simplified version of an example channel-plot panel rendered at a client station.

Turning now to FIG. 7D, a more detailed version of details panel 750 is depicted. In this example, details panel 750 is a channel-plot panel that provides a time-series graph 751 of values of a particular channel (e.g., an exhaust outlet sensor) from particular window of time (e.g., August 20$^{th}$ to September 7$^{th}$). Asset data platform 102 may have derived the given insight represented by insight entry 730b based on some portion of these sensor values.

As shown, time-series graph 751 includes range lines 752 and 753 that represent the normal or expected range of values from the exhaust outlet sensor. Time-series graph 751 also includes outlier indicator 754 that indicates a sensor value that asset data platform 102 identified as being abnormal. In some implementations, a user may interact with outlier indicator 754 (e.g., by hovering over this GUI element) and additional details regarding that sensor value may be displayed. Channel-plot panel 750 also includes download element 755 that enables a user to download to a client station the underlying data for time-series graph 751.

Figure 7E:
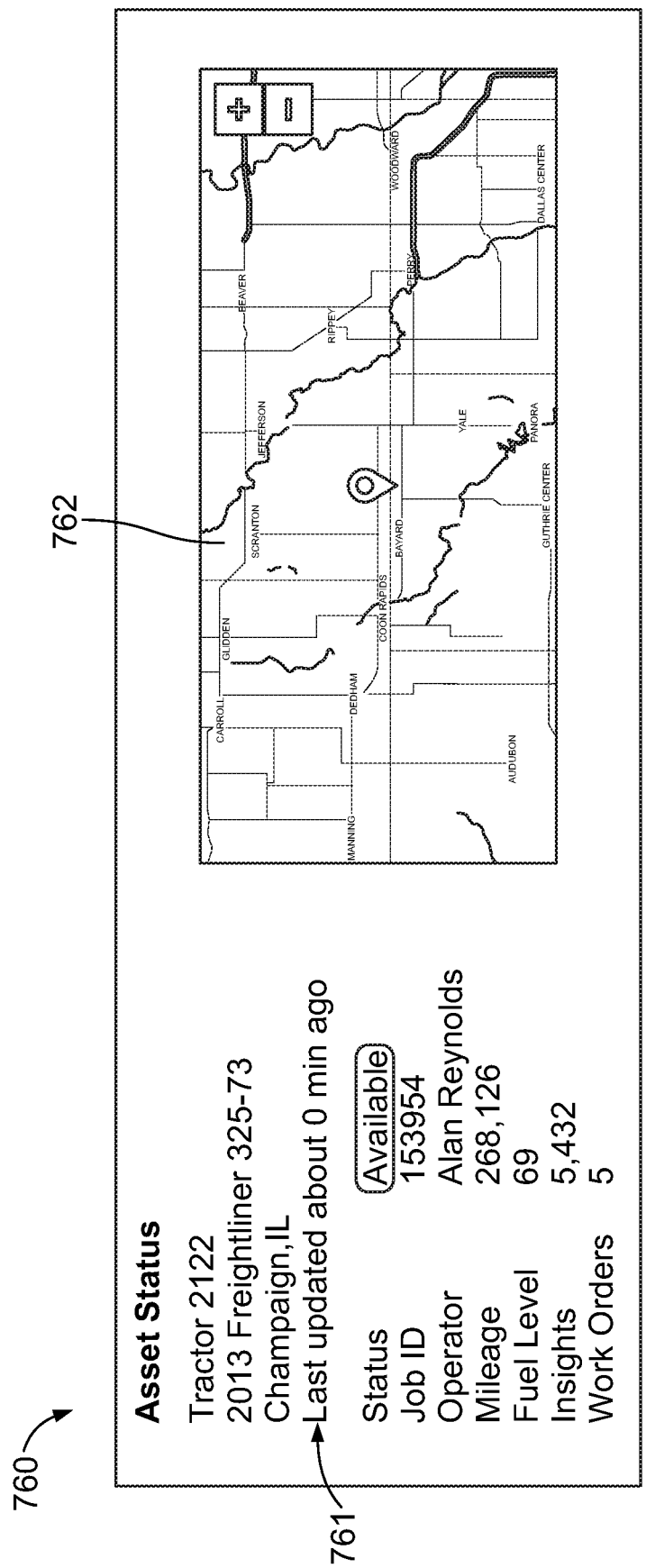
FIG. 7E depicts a simplified version of an example asset-status panel rendered at a client station.

Turning now to FIG. 7E, a more detailed version of details panel 760 is depicted. In this example, details panel 760 is an asset-status panel that provides additional details regarding the status of the particular asset that corresponds to the given insight represented by insight entry 730b. As shown, asset-status panel 760 includes asset information 761 that provides various information regarding the particular asset's most recently known state (e.g., the status of the asset at the time when asset-status panel 760 was caused to be rendered). Examples of asset information include the asset's last known location, status (e.g., available, under-repair, inoperable, etc.), job identifier, operator, mileage, fuel level, number of insights related to the asset, and number of outstanding work orders, among other examples. Asset-status panel 760 also includes an interactive map 762 that depicts the particular asset's location. In some implementations, the asset's location shown in interactive map 762 may be updated in real time as the particular asset moves.

Turning now to FIG. 7F, a more detailed version of details panel 770 is depicted. In this example, details panel 770 is a recent-events panel that provides details regarding recent events that occurred at the particular asset that corresponds to the given insight represented by insight entry 730b. In particular, recent-events panel 770 provides a faults table 771 providing details regarding recent fault codes that triggered at the particular asset. In some instances, faults table 771 may only display recent faults that triggered at the particular asset and are related to the derived insight represented by insight entry 730b. A download element 772 is provided that enables a user to download to a client station the underlying data for faults table 771.

As mentioned above, asset data platform 102 enables a user to interact with an insights GUI view in a variety of manners in addition to selecting a particular insight entry from an insights pane. In this respect, returning to FIG. 6B, if asset data platform 102 processes input data and determines that the data is not indicative of a selection of an insight entry, platform 102 may then determine whether the data is indicative of an interaction that warrants updating the insights pane.

If asset data platform 102 determines that updating the insights pane is not warranted, at block 624, platform 102 may facilitate carrying out the user's interaction. For example, asset data platform 102 may provide the given user with the option to apply one or more filters to the insight entries that are presented via the insights pane.

In this regard, as one possible implementation, the insights pane may include GUI elements that allow the given user to select between different filter options for the particular subset of insights that are presented to the given user via the insights pane. In practice, some or all of the selectable filter GUI elements may be accessible by a user in a variety of manners, such as via a sliding "drawer" (or the like) or a "settings" page that comprises the filter GUI elements, among other possibilities. Some possible examples of filter criteria that can be applied include status-based filters (e.g., filtering out insights that have been marked as dismissed and/or closed), priority-based filters (e.g., filtering down to only the highest priority insights), and/or time-based filters, among other possibilities. Based on receiving input data indicative of such a selection, platform 102 may cause appropriate insight entries to be reorganized in the insights pane or removed from view altogether. A person of ordinary skill in the art will appreciate that platform 102 is also configured to handle scenarios in which one or more of these applied filter criteria are subsequently disabled or otherwise removed (e.g., via subsequent selections by the user).

In some implementations, additionally or alternatively to user-defined filter criteria, asset data platform 102 may include one or more predefined filter criteria that may be applied by "default" and may be disabled or otherwise removed based on user inputs. Other examples are also possible.

On the other hand, if asset data platform 102 determines that the input data is indicative of a user interaction that warrants updating the insights pane, platform 102 may return to block 606 of process 600 and carry out the applicable functions. For example, platform 102 may receive input data indicating a user interaction of a request to take a particular action on a given insight (e.g., mark as "closed", dismiss the given insight, open a task or work order, etc.) or a request to refresh the displayed insights, among other example interactions. In response to receiving such data, platform 102 may update the subset of insights based on (i) the nature of the user interaction (e.g., by removing a given insight from the subset that was marked as "closed" or that was dismissed) and (ii) perhaps also based on either or both of user preferences information or data defining the most up-to-date universe of available insights that have been derived by platform 102.

In some cases, while updating the particular subset of insights to be presented to the given user, the asset data platform 102 may also re-evaluate whether any insights in the updated subset are related, such that these insights should be grouped together. In this respect, an insight that is newly grouped into an aggregated insight will no longer be presented as an individual insight entry in the insights pane, to the extent that it previously was so presented.

In some instances, a user interaction may correspond to an insight entry representing an aggregated insight. In this respect, asset data platform 102 may provide certain advanced user functionality with respect to aggregated insights. For example, if platform 102 receives data indicative of a request for a certain action to be taken with respect to a given aggregated-insight entry, platform 102 may carry out that action with respect to the aggregated-insight and the individual insights that define the group, such as by removing the insights from the particular subset based on a user input marking the aggregated insight as "dismissed." As one illustrative example, if platform 102 receives, in response to a selection of create-task element 737, input data indicative of a created task for the aggregated insight represented by insight entry 730b, platform 102 may apply the created task to each of the 678 individual insights represented by the aggregated insight.

In a related aspect, the logic for aggregating related insights into a group may also consider user-requested actions for insights in the group when determining whether to aggregate insights. For example, the logic may dictate that insights related to a common underlying problem should continue to be aggregated together into a group until a user requests that a task or work order (or the like) be created for (or some other action be taken on) one of the insights in the group, after which time any new insights related to that same problem may be grouped into a separate aggregated insight.

In this way, a user request may close a given aggregated insight and cause any new, related insights to be grouped into a new, separate aggregated insight.

In any case, asset data platform 102 may ultimately define an updated subset of insights to be presented to the given user at block 606. In turn, based on (i) the data defining the updated subset of insights and (ii) the logic for the insights pane, platform 102 may then generate an updated data object that enables client station 106A to render an updated insights pane. Platform 102 may then transmit at least the new data object defining the updated insight pane to client station 106A, which in turn renders the insights view comprising an updated version of the insights pane using the new data object.

The insights GUI view may facilitate various other user interactions as well. For instance, in some implementations, the GUI view may include a download (or "export") element or the like that enables a user to download to one or more client stations and/or to send as an attachment in an email to one or more recipients a particular insights GUI view itself, some or all data underlying the particular insights GUI view, and/or some or all data underlying one or more panes and/or panels.

As mentioned before, an insights GUI view may include other panes in addition to the insights and details panes. For example, asset data platform 102 may also present a "snapshot" pane that can be accessed from various areas of the insights GUI view (e.g., as a popup or slide-out display). In practice, a snapshot pane may include a level of detail regarding a derived insight that is somewhere in between the individual entries included in the insights pane and the details pane. In some implementations, a "snapshot" pane may be accessible via various aspects of an application (e.g., different pages/screens of an application) or the like hosted by platform 102 (e.g., an application associated with the insights GUI view or some other application) and may be linked to the insights GUI view to provide quick access to the insight GUI view via a user input at the "snapshot" pane. Other examples of additional panes are also possible.

In some example implementations, all of the various GUI panes that are included in (or otherwise accessible via) an insights GUI view (e.g., the insights, details, and snapshot panes) may include one or more interactive elements that, when selected, result in a particular action being taken with respect to a given insight (e.g., the insight may be marked as disregarded or otherwise resolved) or result in a request for certain actions to be taken with respect to the asset corresponding to a given insight (e.g., a request for an asset work order or other task item to be created). For example, as discussed above with reference to FIGS. 7A-7F, at least example insight entries 730a-g and example summary panel 740 include insight-action elements. In this way, a user can efficiently and readily select an action for a given insight, regardless of the particular pane that the user is currently viewing.

V. CONCLUSION

Example embodiments of the disclosed process have been described above. Those skilled in the art will understand, however, that changes and modifications may be made to the embodiments described without departing from the true scope and sprit of the present invention, which will be defined by the claims.

Further, to the extent that examples described herein involve operations performed or initiated by actors, such as "humans," "operators," "users" or other entities, this is for purposes of example and explanation only. The claims should not be construed as requiring action by such actors unless explicitly recited in the claim language.

We claim:

1. A computing system comprising:
a network interface configured to communicatively couple the computing system to a plurality of data sources;
at least one processor;
a non-transitory computer-readable medium; and
program instructions stored on the non-transitory computer-readable medium that are executable by the at least one processor to cause the computing system to:
receive data related to the operation of a plurality of assets;
based on the received data, derive a plurality of insights related to the operation of at least a subset of the plurality of assets;
from the plurality of insights, define a given subset of insights to be presented to a given user;
define at least one aggregated insight, wherein the at least one aggregated insight is representative of two or more individual insights in the given subset of insights that are related to a common underlying problem, and wherein the at least one aggregated insight is included in the given subset of insights to be presented to the given user in place of the two or more individual insights; and
cause a client station associated with the given user to display a visualization of the given subset of insights to be presented to the given user that includes (i) an insights pane comprising at least a partial listing of the given subset of insights that includes the at least one aggregated insight in place of the two or more individual insights that are represented by the at least one aggregated insight and (ii) a details pane that provides additional details regarding a selected one of the given subset of insights.

2. The computing system of claim 1, wherein the partial listing of the given subset of insights comprises a plurality of insight entries corresponding to the given subset of insights, wherein each respective insight entry comprises a graphical user interface element indicative of a severity level that has been assigned to a corresponding insight of the given subset of insights.

3. The computing system of claim 1, wherein each of the plurality of insights comprises an insight of a particular category, wherein the particular category comprises one of (i) an outlier insight indicative of a measurement value output by a sensor of an asset being considered abnormal, (ii) a critical fault insight indicative of an occurrence at an asset of a type of fault deemed to be critical, (iii) a failure prediction insight indicative of a prediction that an asset failure is likely to occur at an asset in the future, or (iv) an anomaly insight indicative of a prediction that measurement values output by an asset are indicative of a potential problem at the asset.

4. The computing system of claim 1, wherein the program instructions that are executable to cause the computing system to derive the plurality of insights comprise program instructions that are executable to cause the computing system to:
derive at least a first insight of the plurality of insights based on executing a predictive model that is configured to output a prediction based on at least some of the received data.

5. The computing system of claim 4, wherein the program instructions that are executable to cause the computing system to derive the plurality of insights further comprise program instructions that are executable to cause the computing system to:
derive at least a second insight of the plurality of insights based on detecting an occurrence of an asset fault deemed to be critical based on at least some of the received data.

6. The computing system of claim 1, wherein the program instructions that are executable to cause the computing system to define the at least one aggregated insight comprise program instructions that are executable to cause the computing system to:
determine that the two or more individual insights in the given subset of insights (i) are associated with times that are within a threshold amount of time of one another and (ii) correspond to a common underlying problem at a given one of the plurality of assets; and
based on the determination, derive the at least one aggregated insight.

7. The computing system of claim 1, wherein the program instructions that are executable to cause the computing system to cause the client station associated with the given user to display the visualization of the given subset of insights comprise program instructions that are executable to cause the computing system to:
generate data objects that are representative of the insights pane and the details pane; and
transmit the generated data objects to the client station.

8. The computing system of claim 7, wherein the details pane comprises two or more panels that each provides a respective subset of the additional details regarding the selected one of the given subset of insights, and wherein the program instructions that are executable to cause the computing system to generate the data object that is representative of the details pane comprise program instructions that are executable to cause the computing system to:
dynamically determine which two or more panels to include in the details pane based on given data defining the selected one of the given subset of insights.

9. The computing system of claim 8, wherein the given data defining the selected one of the given subset of insights comprises data identifying an insight category for the selected one of the given subset of insights.

10. The computing system of claim 7, wherein the program instructions that are executable to cause the computing system to generate the data object that is representative of the details pane comprise program instructions that are executable to cause the computing system to:
dynamically determine which additional details to provide regarding the selected one of the given subset of insights based on given data defining the selected one of the given subset of insights.

11. The computing system of claim 10, wherein the given data defining the selected one of the given subset of insights comprises an identifier of a predictive model that was used to derive the selected one of the given subset of insights.

12. A non-transitory computer-readable medium comprising program instructions that are executable to cause a computing system to:
receive data related to the operation of a plurality of assets;
based on the received data, derive a plurality of insights related to the operation of at least a subset of the plurality of assets;

from the plurality of insights, define a given subset of insights to be presented to a given user;

define at least one aggregated insight, wherein the at least one aggregated insight is representative of two or more individual insights in the given subset of insights that are related to a common underlying problem, and wherein the at least one aggregated insight is included in the given subset of insights to be presented to the given user in place of the two or more individual insights; and cause a client station associated with the given user to display a visualization of the given subset of insights to be presented to the given user that includes (i) an insights pane comprising at least a partial listing of the given subset of insights that includes the at least one aggregated insight in place of the two or more individual insights that are represented by the at least one aggregated insight and (ii) a details pane that provides additional details regarding a selected one of the given subset of insights.

13. The computer-readable medium of claim 12, wherein each of the plurality of insights comprises an insight of a particular category, wherein the particular category comprises one of (i) an outlier insight indicative of a measurement value output by a sensor of an asset being considered abnormal, (ii) a critical fault insight indicative of an occurrence at an asset of a type of fault deemed to be critical, (iii) a failure prediction insight indicative of a prediction that an asset failure is likely to occur at an asset in the future, or (iv) an anomaly insight indicative of a prediction that measurement values output by an asset are indicative of a potential problem at the asset.

14. The computer-readable medium of claim 12, wherein the program instructions that are executable to cause the computing system to derive the plurality of insights comprise program instructions that are executable to cause the computing system to:

derive at least a first insight of the plurality of insights based on executing a predictive model that is configured to output a prediction based on at least some of the received data; and derive at least a second insight of the plurality of insights based on detecting an occurrence of an asset fault deemed to be critical based on at least some of the received data.

15. The computer-readable medium of claim 12, wherein the program instructions that are executable to cause the computing system to define the at least one aggregated insight comprise program instructions that are executable to cause the computing system to:

determine that the two or more individual insights in the given subset of insights (i) are associated with times that are within a threshold amount of time of one another and (ii) correspond to a common underlying problem at a given one of the plurality of assets; and based on the determination, derive the at least one aggregated insight.

16. The computer-readable medium of claim 12, wherein the program instructions that are executable to cause the computing system to cause the client station associated with the given user to display the visualization of the given subset of insights comprise program instructions that are executable to cause the computing system to:

generate data objects that are representative of the insights pane and the details pane; and transmit the generated data objects to the client station.

17. The computer-readable medium of claim 16, wherein the details pane comprises two or more panels that each provides a respective subset of the additional details regarding the selected one of the given subset of insights, and wherein the program instructions that are executable to cause the computing system to generate the data object that is representative of the details pane comprise program instructions that are executable to cause the computing system to:

dynamically determine which two or more panels to include in the details pane based on given data defining the selected one of the given subset of insights, wherein the given data defining the selected one of the given subset of insights comprises data identifying an insight category for the selected one of the given subset of insights.

18. The computer-readable medium of claim 16, wherein the program instructions that are executable to cause the computing system to generate the data object that is representative of the details pane comprise program instructions that are executable to cause the computing system to:

dynamically determine which additional details to provide regarding the selected one of the given subset of insights based on given data defining the selected one of the given subset of insights, wherein the given data defining the selected one of the given subset of insights comprises an identifier of a predictive model that was used to derive the selected one of the given subset of insights.

19. A computer-implemented method comprising:

receiving data related to the operation of a plurality of assets;

based on the received data, deriving a plurality of insights related to the operation of at least a subset of the plurality of assets;

from the plurality of insights, defining a given subset of insights to be presented to a given user;

defining at least one aggregated insight, wherein the at least one aggregated insight is representative of two or more individual insights in the given subset of insights that are related to a common underlying problem, and wherein the at least one aggregated insight is included in the given subset of insights to be presented to the given user in place of the two or more individual insights; and causing a client station associated with the given user to display a visualization of the given subset of insights to be presented to the given user that includes (i) an insights pane comprising at least a partial listing of the given subset of insights that includes the at least one aggregated insight in place of the two or more individual insights that are represented by the at least one aggregated insight and (ii) a details pane that provides additional details regarding a selected one of the given subset of insights.

20. The method of claim 19, wherein each of the plurality of insights comprises an insight of a particular category, wherein the particular category comprises one of (i) an outlier insight indicative of a measurement value output by a sensor of an asset being considered abnormal, (ii) a critical fault insight indicative of an occurrence at an asset of a type of fault deemed to be critical, (iii) a failure prediction insight indicative of a prediction that an asset failure is likely to occur at an asset in the future, or (iv) an anomaly insight indicative of a prediction that measurement values output by an asset are indicative of a potential problem at the asset.

* * * * *